United States Patent
Nagatsuka et al.

(10) Patent No.: US 7,194,471 B1
(45) Date of Patent: Mar. 20, 2007

(54) DOCUMENT CLASSIFICATION SYSTEM AND METHOD FOR CLASSIFYING A DOCUMENT ACCORDING TO CONTENTS OF THE DOCUMENT

(75) Inventors: Tetsuro Nagatsuka, Kanagawa (JP); Tatsuo Miyachi, Tokyo (JP); Atsuo Shimada, Kanagawa (JP); Kazutoshi Takeya, Kanagawa (JP); Eiji Kemmochi, Tokyo (JP); Akiko Nakajima, Tokyo (JP); Makoto Yamasaki, Tokyo (JP); Katsuhiko Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/288,856

(22) Filed: Apr. 9, 1999

(30) Foreign Application Priority Data

Apr. 10, 1998 (JP) ............................. 10-114414
Apr. 13, 1998 (JP) ............................. 10-115907

(51) Int. Cl.
*G06F 17/00* (2006.01)
*G06F 7/00* (2006.01)
(52) U.S. Cl. ........................ 707/100; 707/6
(58) Field of Classification Search ............ 707/3, 707/4, 5, 6, 9, 10, 100, 7; 704/1, 9; 382/159
See application file for complete search history.

(56) References Cited

U.S. PATENT DOCUMENTS

| 4,839,853 | A |   | 6/1989 | Deerwester et al. |
| 5,943,669 | A | * | 8/1999 | Numata ............ 707/5 |
| 6,094,653 | A | * | 7/2000 | Li et al. ............ 707/6 |
| 6,122,399 | A | * | 9/2000 | Moed ............ 382/159 |
| 6,125,362 | A | * | 9/2000 | Elworthy .......... 707/6 |
| 6,470,307 | B1 | * | 10/2002 | Turney ............ 704/9 |

FOREIGN PATENT DOCUMENTS

| JP | 6-19962 | 1/1994 |
| JP | 7-36897 | 2/1995 |
| JP | 07-114572 | 5/1995 |
| JP | 8-263514 | 10/1996 |
| JP | 10-83399 | 3/1998 |

OTHER PUBLICATIONS

Hinrich Schütze, et al., "Projections for Efficient Document Clustering", Proceedings of SIGIR 1997, pp. 74-81.
Brian T. Bartell, et al., "Representing Documents Using an Explicit Model of Their Similarities", Journal of the American Society for Information Science, May 1995, vol. 46, No. 4, pp. 254-271.
U.S. Appl. No. 09/288,856, filed Apr. 9, 1999, Nagatsuka et al.

(Continued)

*Primary Examiner*—Sam Rimell
(74) *Attorney, Agent, or Firm*—Oblon, Spivak, McClelland, Maier & Neustadt, P.C.

(57) ABSTRACT

A document classification system and method reflects operator's intention in a result of classification of document so that an accurate result of classification can be achieved. The document to be classifies has contents contains a plurality of items. At least one of the items contained in the document is designated. The document data is converted into converted data so that the converted data contains only data corresponding to the designated item. Classification of the document is done by using the converted data.

24 Claims, 28 Drawing Sheets

OTHER PUBLICATIONS

U.S. Appl. No. 10/600,342, filed Jun. 23, 2003, Takeya.
Atsuo Kawai, "An Automatic Document Classification Method Based on a Semantic Category Frequency Analysis", NTT Telecommunication Networks Laboratories, vol. 33, No. 9, Sep. 1992, English Translation pp. 1-23, Japanese pp. 1114-1112.

* cited by examiner

Application Number
    Japanese Patent Application No.3-000000

Filing Date
    January 1, 1996

Inventor(s)
    Taro Yamada

Title of the Invention
    INFORAMTOIN PROCESSING APPARATUS

Object
    An object of the present invention is to ··· store corresponding screen information with history information.

Constitution
    The input unit 7 ··· displayed on a display unit 24.

Claim 1
    An information processing apparatus comprising: ··· which is displayed on a multi-window.

Prior Art
    FIG.2 shows an information ··· can be displayed.

Means for Solving the Problem
    In order to achieve the above-mentioned objects, ··· which is displayed on a multi-window.

Action
    According to the above-mentioned structure, ··· operates to display the screen information.

Embodiment
    A description will now be given, ··· the screen information can be displayed.

Effect of the Invention
    According to the present invention, ··· effectively reproduced.

502

An object of the present invention is to ··· store corresponding screen information with history information. In order to achieve the above-mentioned objects, ··· which is displayed on a multi-window. According to the above-mentioned structure, ··· operates to display the screen information. According to the present invention, ··· effectively reproduced.

FIG. 6

```
Application Number
     Japanese Patent Application No.3-000000

Filing Date
     January 1, 1996

Inventor(s)
     Taro Yamada

Title of the Invention
     INFORAMTOIN PROCESSING APPARATUS

Object
     An object of the present invention is to ··· store
corresponding screen information with history
information.

Constitution
     The input unit 7 ··· displayed on a display unit 24.

Claim 1
     An information processing apparatus comprising: ···
which is displayed on a multi-window.

Prior Art
     FIG.2 shows an information ··· can be displayed.

Means for Solving the Problem
     In order to achieve the above-mentioned objects,
··· which is displayed on a multi-window.

Action
     According to the above-mentioned structure, ···
operates to display the screen information.

Embodiment
     A description will now be given, ··· the screen
information can be displayed.

Effect of the Invention
     According to the present invention, ··· effectively
reproduced.
```

501

601

```
An object of the present invention is to ··· store
corresponding screen information with history
information. ⓘ In order to achieve the above-mentioned
objects, ··· which is displayed on a multi-window. ⓘ
According to the above-mentioned structure, ··· operates
to display the screen information. ⓘ According to the
present invention, ··· effectively reproduced.
```

601

DOCUMENT FEATURE VECTOR

DELETE WORD 2 AND WORD 5

|   |       | DOCUMENT1 | DOCUMENT2 | DOCUMENT3 | DOCUMENT4 | DOCUMENT5 |
|---|-------|-----------|-----------|-----------|-----------|-----------|
| 1 | WORD1 | 1 | 2 | 3 | 3 | 0 |
| 2 | WORD2 | 3 | 0 | 0 | 0 | 2 |
| 3 | WORD3 | 0 | 0 | 1 | 0 | 2 |
| 4 | WORD4 | 0 | 2 | 0 | 0 | 3 |
| 5 | WORD5 | 2 | 1 | 0 | 5 | 0 |
| 6 | WORD6 | 0 | 3 | 1 | 1 | 1 |
| 7 | WORD7 | 1 | 2 | 2 | 0 | 2 |

|   |       | DOCUMENT1 | DOCUMENT2 | DOCUMENT3 | DOCUMENT4 | DOCUMENT5 |
|---|-------|-----------|-----------|-----------|-----------|-----------|
| 1 | WORD1 | 1 | 2 | 3 | 3 | 0 |
| 3 | WORD3 | 0 | 0 | 1 | 0 | 2 |
| 4 | WORD4 | 0 | 2 | 0 | 0 | 3 |
| 6 | WORD6 | 0 | 3 | 1 | 1 | 1 |
| 7 | WORD7 | 1 | 2 | 2 | 0 | 2 |

— # DOCUMENT CLASSIFICATION SYSTEM AND METHOD FOR CLASSIFYING A DOCUMENT ACCORDING TO CONTENTS OF THE DOCUMENT

BACKGROUND OF THE INVENTION

1. Field of the Invention

The present invention generally relates to a document classification system and method and, more particularly, to a document classification system and method for classifying a document based on contents of the document. The present invention also relates to a processor readable medium storing a program code for causing a computer to perform the document classification method.

2. Description of the Related Art

Japanese Laid-Open Patent Application No. 7-36897 discloses a document classification system for automatically classifying a document in accordance with a document vector which represents a feature of words contained in the document. The classification is performed by grouping the document vector according to a clustering method.

Generally, document data is created from a document so as to register the document in a database. Generally, attribute data such as information regarding the date of draft and an author's name is added to the document data indicating the contents of the document. Additionally, in many cases, the document itself contains a plurality of items. That is, for example, a patent publication contains a plurality of items including "claims", "description of prior art", "summary of the invention" or "detailed description of the preferred embodiment".

According to the document classification system disclosed in the above-mentioned Japanese Laid-Open Patent Application No. 7-36897, if document data includes a plurality of items, one of the items which is of a particular interest cannot be designated. Accordingly, the document data may include data which may provide undesirable influence to the classification of document. Additionally, data effective for classification of document may be insufficient since a plurality of items cannot be combined or designated. Thus, there is a problem in that an accurate result of classification cannot be obtained from document data.

Additionally, in recent years, a large amount of document information has become accessible since Internet has become popular. This allows a user of the Internet to perform an intellectual work such as classification of a large amount of document information into some categories and analysis of a structure of the classified documents.

If classification of a large amount of document information is done by operator's manual work, it requires an extremely large cost with respect to time and labor. Additionally, since classification is done based on only the knowledge of an individual operator, criteria of classification may vary operator to operator.

Accordingly, it is a very important issue as to how to automatically classify a document by a computer according to classification criteria normally achieved by a human work. More specifically, it is desirous to develop a document classification system that classifies documents having similar contents or meanings into the same category and each category defined in the classification process is one which is similar to the category intended by an operator before performing the classification.

According to the document classification system disclosed in the above-mentioned Japanese Laid-Open Patent Application No. 7-36897, classification is performed by using the document vector which is defined by words contained in a document. Accordingly, there is a problem in that a true content of the document cannot always be represented by the document vector due to synonymity and polysemy of certain words. Specifically, meanings of some words must be judged in relation to other words in the document or contents of the document, and such judgement requires complex processes.

In order to solve such a problem related to synonymity and polysemy, U.S. Pat. No. 4,839,853 suggests a method in which a singular value decomposition is applied to a matrix of an inner product between documents. That is, a document search in which a relationship in meanings is reflected is performed by projecting a document and a word onto a space referred to as a latent semantic index produced based on simultaneity of the document and the word.

Additionally, "Projection for Efficient Document Clustering" by Hinrich Schutze and Craing Silverstein, Proceedings of SIGIR 1997, pp 74–81, suggests document classification in the above-mentioned latent semantic index. Further, "Representing Documents Using an Explicit Model of Their Similarities" by Brian T. Bartell, Garrison W. Cottrell and Richard K. belew, Journal of the American Society for Information Science, 1995, vol. 46, No. 4, pp 254–271, teaches generalization of a method of transformation into the above-mentioned latent semantic index. A matrix used for calculating a transforming function is a sum of an inner product between documents and a matrix produced from cross-reference information of other documents. A representation transforming function, which is used for projecting a document or a word onto a space in which similarity of the documents is reflected, is produced by using such a matrix.

Each dimension of the projection space produced by the above-mentioned conventional method is a conceptual dimension defined by a plurality of words being connected with respect to the meanings thereof. A determination as to which feature dimension should be used to classify a document or search a document is performed based on only a magnitude of a singular value calculated when a singular value decomposition is applied. Accordingly, it is difficult to reflect operator's intention in the selection of the feature dimension used for classification. Thus, there is a problem in that a result of classification is different from the expectation of the operator.

Additionally, according to other conventional document classification methods, in order to perform document classification which reflects relationship between documents with respect to meanings thereof, a process for calculating a representation transforming function for transforming a document and a process for classifying the document transformed by the representation transforming function are continuously performed. However, there is a problem in that the process for calculating the representation transforming function takes a long time, and, as a result, the document classification takes an extremely long time.

SUMMARY OF THE INVENTION

It is a general object of the present invention to provide an improved and useful document classification system and method in which the above-mentioned problems are eliminated.

A more specific object of the present invention is to provide a document classification system and method that can reflect operator's intention in a result of classification of document so that an accurate result of classification can be achieved.

Another object of the present invention is to provide a document classification system and method that can efficiently and repeatedly perform a document classification process in a short time with operator's intention being reflected in a result of classification.

In order to achieve the above-mentioned objects, there is provided according to one aspect of the present invention a document classification method for classifying a document based on contents of the document of which contents contains a plurality of items, said document classification method comprising the steps of:

inputting document data corresponding to the document data;

designating at least one of the items contained in the document input in the inputting step;

converting the document data into converted data so that the converted data contains only data corresponding to the item designated in the designating step; and classifying the document by using the converted data produced in the converting step.

According to the above-mentioned invention, when the document is classified, the classification is performed base on only the data corresponding to the designated items. Since the items can be designated according to the operator's intention, a result of the classification can be prevented from being influenced by items which the operator thinks unnecessary for the classification. Thus, a result of classification that is desired by the operator can be efficiently performed by designating appropriate items contained in the document to be classified.

In the above-mentioned method, the classifying step may include the step of producing a feature vector representing a feature of the converted data so as to classify the document in accordance with the feature vector. Since the feature vector is produced from the converted data which contains only the designated items, a result of classification that is desired by the operator can be efficiently performed by designating appropriate items contained in the document to be classified.

Additionally, the converting step may include the step of inserting a predetermined sign between sets of data corresponding to the items so as to facilitate separation of each data corresponding to each item in the converted data.

Additionally, there is provided according to another aspect of the present invention a document classification method for classifying a document according to contents of the document, the document classification method comprising the steps of:

inputting document data of the document;

analyzing the document data so as to obtain analysis information;

producing a document feature vector with respect to the document data based on the analysis information;

calculating a representation transforming function used for projecting the document feature vector onto a space in which similarity between the document feature vectors is reflected;

transforming the document feature vector by using the representation transforming function;

classifying the document based on similarity between the document feature vectors transformed in the step of transforming; and storing a result of classification performed in the step of classifying.

According to this invention, the representation transforming function is calculated based on similarity between the documents to be classified, and the document classification is performed in a representation space in which a relationship in meanings between the documents can be reflected. Thus, the document classification in which operator's intention is reflected can be achieved.

The above-mentioned document classification method may further comprise the step of calculating an inner product between the document feature vectors, wherein the representation transforming function is calculated by using the inner product. Accordingly, a relationship in meanings between documents can be reflected in the document classification.

Additionally, the document classification method according to the present invention may further comprise the step of setting document similarity setting information including data representing an author of the document and a date of production of the document, wherein the representation transforming function is calculated by using the inner product and the document similarity information. Accordingly, a relationship in meanings between documents can be reflected in the document classification.

The document classification method according to the present invention may further comprise the steps of:

storing the document feature vector produced in the step of producing said document feature vector; and storing the representation transforming function calculated in the step of calculating said representation transforming function.

According to this invention, the process for calculating the representation transforming function and the process for classifying the document can be separately performed. That is, the process for calculating the representation transforming function is not always be performed before the process for classifying the document. Additionally, the representation transforming function can be previously calculated based on other document data. Thus, the process for classifying the document can be repeatedly performed in a short time.

Additionally, the document classification method according to the present invention may further comprise the step of correcting the document feature vector before the document feature vector is transformed in the step of transforming, a correction being performed by processing one of the document feature vector and a feature dimension constituting the document feature vector in accordance with a rule established by characteristics of words extracted in the step of analyzing.

According to this invention, different words can be deleted for each classification process by processing the document feature vector or the feature dimension.

Additionally, the above-mentioned document classification method may further comprise the step of correcting the representation transforming function calculated in the step of calculating when the feature dimension is changed due to a correction of the document feature vector in the step of correcting so that the document feature vector is transformed in the step of transforming in accordance with the changed feature dimension.

According to this invention, when the representation transforming function is calculated based on the inner products between the document feature vectors, inconsistency generated in the representation transforming function due to a process applied to the document feature vector or the feature dimension can be easily corrected. Thus, an accurate transformation of the document feature vector can be performed.

Additionally, the document classification method according to the present invention may further comprise the steps of:

sending an instruction regarding a process to be applied on a feature dimension of the representation transforming function; and correcting the representation transforming function based on a content of the instruction sent in the step of sending.

Accordingly, the operator can easily apply a process to the feature dimension of the space constituted by the representation transforming function. Thus, operator's intention can be reflected in the document classification.

Additionally, the document classification method according to the present invention may further comprise the steps of:

designating an initial cluster centroid; and registering the initial cluster centroid designated in the step of designating, wherein the document is classified in accordance with the initial cluster centroid registered in the step of registering.

According to the above-mentioned invention, the operator can arbitrarily designate the initial cluster centroid, and, thereby, operator's intention can be reflected in the document classification.

Additionally, there is provided according to another aspect of the present invention a document classification system performing the above-mentioned document classification methods.

Further, there is provided according to another aspect of the present invention a processor readable medium storing program code causing a computer to perform the above-mentioned document classification methods.

Other objects, features and advantages of the present invention will become more apparent from the following detailed descriptions when read in conjunction with the accompanying drawings.

BRIEF DESCRIPTION OF THE DRAWINGS

FIG. 5 is an illustration for explaining an example of document data and converted data obtained from the document data;

FIG. 6 is an illustration for explaining the document data and the converted data shown in FIG. 5 when a separation sign "/" is inserted between the sentences;

DETAILED DESCRIPTION OF THE PREFERRED EMBODIMENTS

Figure 1:
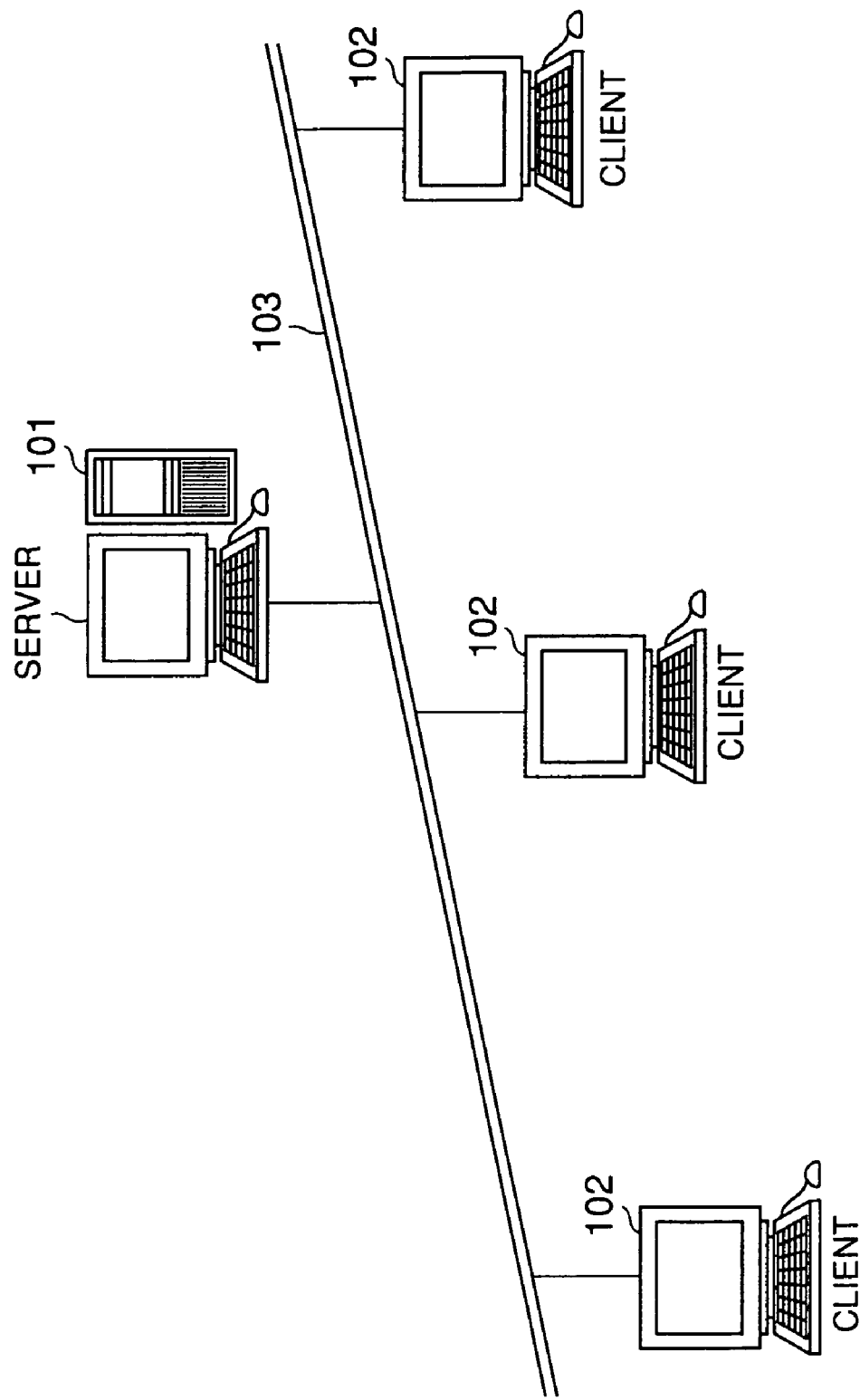
FIG. 1 is an illustration of a hardware structure of an entire information processing system which constitutes a document classification system according to a first embodiment of the present invention.

A description will now be given of a first embodiment of the present invention. FIG. 1 is an illustration of a hardware structure of an entire information processing system which constitutes a document classification system according to the first embodiment of the present invention.

The information processing system shown in FIG. 1 is constituted by a server/client system. That is, in the information processing system, a plurality of clients 102 are connected to a server 101 via a network 103.

Each of the clients 102 produces a production of classification data, sends an instruction to the server 101 and displays a result of classification. The server 101 performs a process relating to classification of a document (text) by a large amount of numerical operations, and sends a result of the process to each of the clients 102. More specifically, a classification process is performed by the server 101, and a production of the classification data, instruction of process execution and a display of a result of the classification are performed by each of the clients 102.

Additionally, exchange of data between the server 101 and the clients 102 is done by using a common file method. That is, a file used for a classification process is created in a common folder of the server 101 so as to exchange data between the server 101 and each of the clients 102. Accordingly, each of the clients 102 can use the common folder of the server 101 via the network 103.

Figure 2:
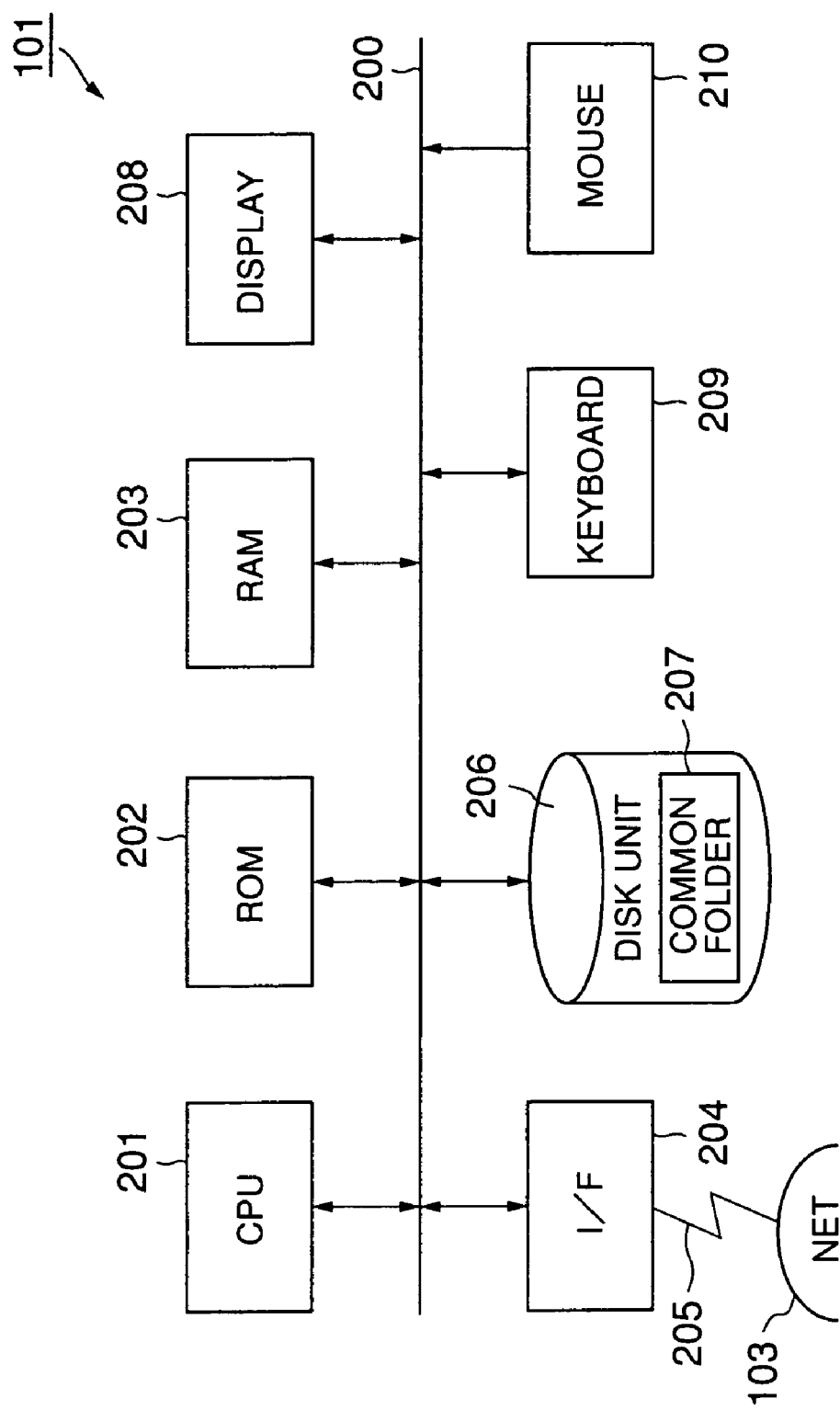
FIG. 2 is a block diagram of a hardware structure of a server shown in FIG. 1.

A description will now be given of a hardware structure of the server 101 and each of the clients 102. FIG. 2 is a block diagram of a hardware structure of the server 101 shown in FIG. 1. As for the server 101, a work-station is used, for example.

As shown in FIG. 2, the server 101 comprises a CPU 201, a ROM 202, a RAM 203, an interface (I/F) 204, a disk unit 206, a keyboard 209 and a mouse 210 each of which is connected to a bus 200. The CPU 201 controls the entire operation of the server 101. The ROM 202 stores programs including a boot program. The RAM 203 is used as a work area of the CPU 201. The interface 204 is connected to the network 103 via a communication line 205. The disk unit 206 stores various sets of data.

The display 208 displays document information, image information and function information. The keyboard 209 and the mouse 210 are used for inputting instructions and data to the server 101. Further a common folder 207 is provided in the disk unit 206 so as to exchange data between the server 101 and each of the clients 102 provided on the net 103.

Figure 3:
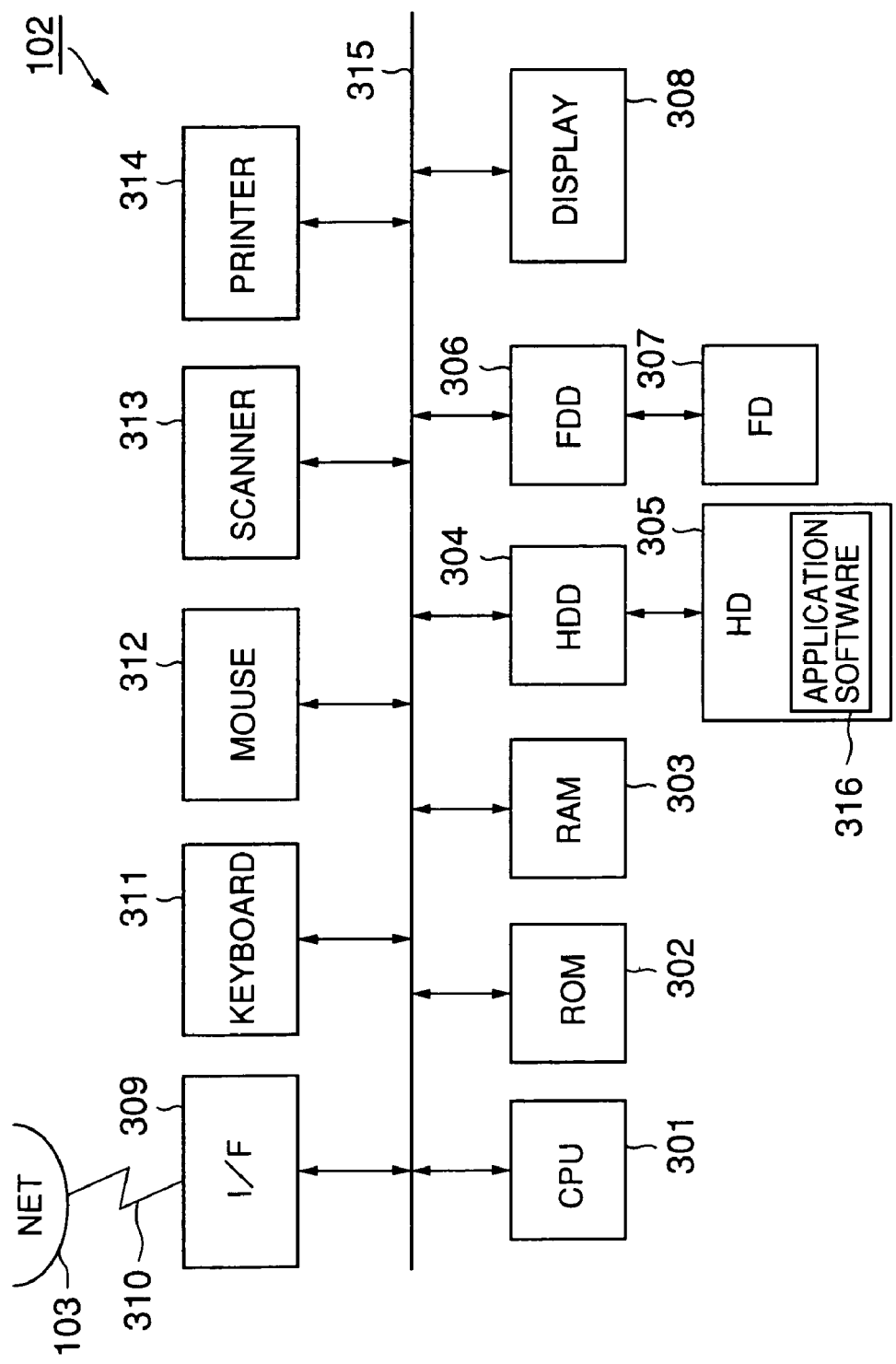
FIG. 3 is a block diagram sowing a hardware structure of a client shown in FIG. 1.

FIG. 3 is a block diagram showing a hardware structure of the client 102 shown in FIG. 1. As for the client 102, a personal computer is used, for example.

As shown in FIG. 3, the client 102 comprises a CPU 301, a ROM 302, a RAM 303, a hard disk drive (HDD) 304, a floppy disk drive (FDD) 306, a display 308, an interface (I/F) 309, a keyboard 311, a mouse 312, a scanner 313 and a printer 314 each of which is connected to a bus 315. The CPU 301 controls the entire operation of the client 102. The ROM 302 stores programs including a boot program. The RAM 303 is used as a work area of the CPU 301.

The hard disk drive 304 reads data from or writes data on a hard disk (HD) 305 in accordance with an instruction by the CPU 301. The floppy disk drive 306 reads data from or writes data on a floppy disk 307 in accordance with an instruction by the CPU 301. The floppy disk 307 is removably attached to the floppy disk drive 306. The display 308 displays document information, image information and function information.

The interface 309 is connected to the network 103 via a communication line 310. The keyboard 311 and the mouse 312 are used for inputting instructions and data to the client 102. The scanner 313 optically reads an image, and has an optical character reader (OCR) function. The printer 314 prints information including a result of classification.

Figure 4:
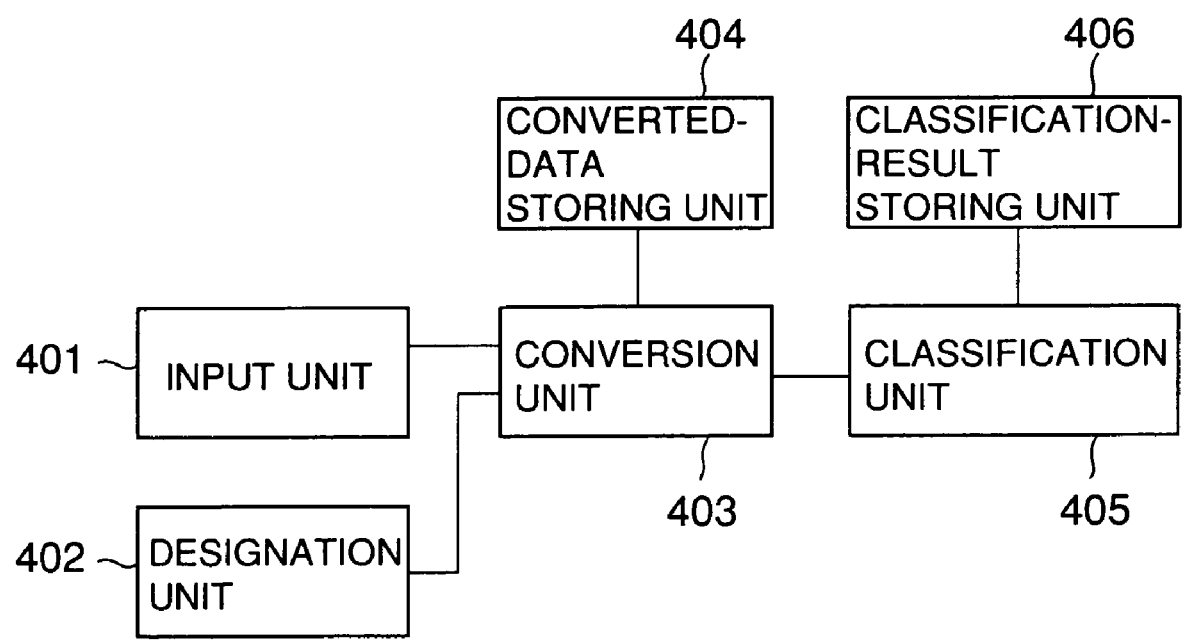
FIG. 4 is a functional block diagram of the document classification system according to the first embodiment of the present invention.

A description will now be given, with reference to FIG. 4, of a function of the document classification system according to the first embodiment of the present invention. FIG. 4 is a functional block diagram of the document classification system according to the first embodiment of the present invention.

A shown in FIG. 4, the document classification system according to the first embodiment of the present invention comprises an input unit 401, a designation unit 402, a conversion unit 403, a converted-data storing unit 404, a classification unit 405 and a classification-result storing unit 406. Each of the input unit 401, the designation unit 402, the conversion unit 403, the converted-data storing unit 404, the classification unit 405 and the classification-result storing unit 406 is achieved by the CPU 201 or the CPU 301 executing programs or application software stored in the ROM 202, the ROM 302, the disk unit 206 or the hard disk 305. In the present embodiment, application software 316 is stored in the hard disk 305.

A description will now be given of a function of each of the above-mentioned units.

<Input Unit 401>

The input unit 401 is provided for inputting document data to be subjected to a classification process. For example, the document data is input from the keyboard 209. The document data can also be input by the scanner 313 which has an optical character reader function. Additionally, the document data can be input from an external apparatus provided on the network 103 via the interface 204 or 309.

For example, if the document data is registered in a database recorded on a recording medium, an installation of such a recording medium into the document classification system is regarded as an input of the document data. The input unit 401 may include a document-data storing unit (not shown in the figure) for storing the input document data. The document-data storing unit may be the disk unit 206 of the server 101 that has a large capacity as a memory.

The document in the present embodiment refers to at least one sentence described by a natural language. Specifically, a patent publication or a specific newspaper article is considered to be a document. Additionally, a claim part of the patent application or a single sentence extracted from the newspaper article is also considered to be a document.

<Designation Unit 402>

The designation unit 402 designates an item of the document data. Specifically, the designation unit 402 comprises the following three processes.

First, the designation unit extracts an item or items from the document data input by the input unit 401 (first process). As for a method for extracting the item, there is a method in which an item provided with a predetermined sign is searched for and selected. The predetermined sign may be parentheses sign such as "[" and "]".

The above-mentioned first process may be performed by the input unit 401 instead of the designation unit 402. That is, the input unit 401 extracts the item of the document data when the document data is input. A result of the extraction is stored in the document-data storing unit by being related to the document data from which the result is obtained. In such a case, the first process is omitted in the designation unit 402 by using the stored result of extraction. Additionally, document data of a certain database may previously provided with information regarding the item. The first process can also be omitted by using such information.

Next, a list of extracted items and contents thereof is produced based on the result of extraction or the previously provided information regarding the items, and the list is presented to an operator (second process). As for a method for presenting, the items alone or the items and the contents thereof are displayed on the display 208 or 308.

As for the method for displaying item name alone, item names may be displayed by being arranged in a column by horizontal writing according to an order based on the frequency of appearance in the document data. In such a case, if the number of items exceeds the number of lines on the display screen, the item names may be displayed by providing two columns on the same display screen or the display screen may be scrolled in a vertical direction so as to display additional item manes.

As for the method for displaying item name and contents thereof, similar to the above-mentioned method for displaying item name alone, item names may be displayed by being arranged in a column by horizontal writing according to an order based on the frequency of appearance in the document data, and the contents thereof are displayed on the right side of the corresponding item names by horizontal writing. In such a case, if the amount of contents to be displayed is large, the display screen may be scrolled in a horizontal direction.

Alternatively, only the item names may be displayed so that the contents of a desired item is displayed in a pop-up manner by moving a cursor to the desired item name and performing a predetermined operation such as clicking the mouse 210 or 312 or pressing a key of the keyboard 209 or 311.

After the second process is completed, one of the item names, which one is an object to be subjected to a classification process, is designated (third process). At this time, only one item name may be designated or more than two item names may be designated simultaneously. The designation can be done by using the keyboard 209 or 311 or using a pointing device such as the mouse 210 or 312. When more than two items are designated, a form of connection may be designated. Additionally, an order of arrangement of content data after conversion may be designated by an order of designation of the items.

<Conversion Unit 403>

The conversion unit 403 converts the document data into data containing only contents corresponding to the items designated by the designating unit 402. Specifically, the conversion unit 403 extract data corresponding to the designated item in the document data so as to produce converted-data containing only the extracted data.

The converted-data is produced by simply arranging data corresponding to each designated item in a designated order in the original document data. Alternatively, the converted-data may be produced by combining contents of data corresponding to the designated items as a string of characters so as to include only contents corresponding to the designated items. Additionally, the data corresponding to the designated items may be combined after the initial order of designation of the items is changed to a different order.

Additionally, the conversion unit 403 inserts a predetermined separation sign, which is indicated by 601 in FIG. 6 and is described later, between data so that each set of data corresponding to each item can be separated from other sets of data in the converted-data. Accordingly, the end of each set of data in the converted data can be instantaneously judged. The separation sign 601 is particularly effective when the natural language analysis such as the morpheme analysis is performed. When data corresponding to each item is composed of the form of a sentence, that is, when the sentence ends by the punctuation, the pause between the sentence and the sentence can be judged without the separation sign. However, if the contents of data corresponding to each designated item is not composed of the form of a sentence such as an itemized representation or a case in which an item is changed within a sentence, the combined data may represent completely different meanings. The separation sign 601 is inserted so as to avoid such a problem.

Generally, the slash sign "/" as a delimitation mark is used as the separation sign 601. However, if there is a possibility that the slash sign is present in the original converted data, other signs may be used so as to avoid confusion. Additionally, whether to insert or not insert the separation sign 601 may be designated by assigning a key to the keyboard 209 or 311 so that insertion/not insertion is alternatively designated by pressing the assigned key. Such designation may be achieved by providing an icon on the display and clicking the icon.

<Converted-Data Storing Unit 404>

The converted-data storing unit 404 stores the converted data. As for the converted-data storing unit 404, the disk unit 206 of the server 101 or the hard disk 305 or the floppy disk 307 may be used according to an amount of the converted-data or an application of the converted data. The converted-data storing unit 404 also stores the above-mentioned separation sign 601 as well as the converted data that includes information regarding a setting procedure of items. The converted data stored in the converted-data storing unit 404 can be used for another classification.

<Classification Unit 405>

The classification unit 405 automatically classifies the converted data output from the conversion unit 403 or the converted data stored in the converted-data storing unit 404. As for a method for classifying the converted data, a conventional method such as the method used by the document classification system suggested in Japanese Laid-Open Patent Application No. 7-36897 can be used.

<Classification-Result Storing Unit 406>

The classification-result storing unit 406 stores a result of classification performed by the classification unit 405. As for the classification-result storing unit 406, similar to the converted-data storing unit 404, the disk unit 206 of the server 101 or the hard disk 305 or the floppy disk 307 may be used according to an amount of the converted-data or an application of the converted data.

A description will now be given of an example of the document data and the converted-data obtained from the document data. FIG. 5 is an illustration for explaining an example of the document data 501 and the converted data 502 obtained from the document data 501.

The example of the document data 501 is a patent publication data retrieved from a patent database. The document data 501 contains information regarding items contained in the patent publication such as "Patent Application Number", "Filing Date", "Name of the Inventor(s)", "Title of the Invention", "Object", "Constitution", "Claim 1", "Prior Art", "Means for Solving the Problem", "Action", "Embodiment" and "Effect of the Invention".

In the conventional document classification system, each document data is handled as a single set of data. Accordingly, document data containing a plurality of items is also handled as a single set of data, and contents of all of the items in the document data are subjected to the classification process. Thus, there may be included an item unnecessary for a view desired by an operator or an item which provides undesired influence to a result of classification.

However, in the present embodiment, the operator can designate at least one item which is considered to be necessary for the classification. For example, when patent publications are subjected to a classification process and when the operator desires to perform classification with respect to an object of invention, items such as "Object", "Means for Solving the Problem", "Action" and "Effect of the Invention" can be designated. On the other hand, when the operator desires to perform classification with respect to means for solving, the items "Means for Solving the Problem" and "Embodiment" can be designated. When the items to be subjected to classification are designated, the converted data is produced from the document data.

The example of FIG. 5 is a case in which the operator designates the items "Object", "Means for Solving the Problem", "Action" and "Effect of the Invention" from among the items contained in the document data 501, and the converted data 502 is produced based on the designated items of the document data 501.

As shown in FIG. 5, the converted data 502 is produced by extracting and combining sentences corresponding to the items "Object" (An object of the present invention is to . . . store corresponding screen information with history information.), "Means for Solving the Problem" (In order to achieve the above-mentioned objects, which is displayed on a multi-window.), "Action" (According to the above-mentioned structure, . . . operates to display the screen information.) and "Effect of the Invention" (According to the present invention, . . . effectively reproduced.).

FIG. 6 is an illustration for explaining the document data 501 and the converted data 502 shown in FIG. 5 when the separation sign 601 "/" is inserted between the sentences.

Figure 7:
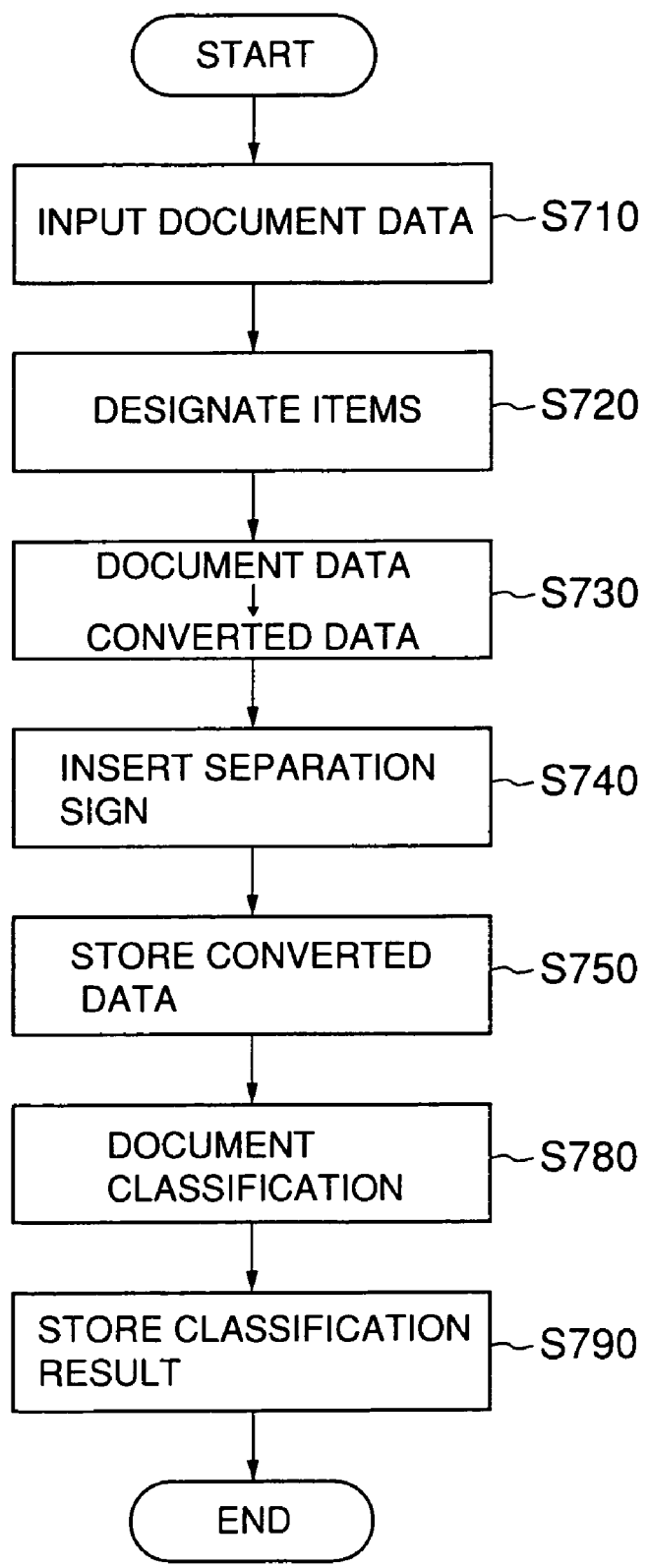
FIG. 7 is a flowchart of an operation of the document classification system according to the first embodiment of the present invention.

A description will now be given, with reference to FIG. 7, of an operation of the document classification system according to the first embodiment of the present invention. FIG. 7 is a flowchart of the operation of the document classification system according to the present invention.

When the operation shown in FIG. 7 is started, the input unit 401 inputs, in step S710, the document data. In step S720, the designation unit 402 designates items in the input document data. Thereafter, in step S730, the conversion unit 403 converts the document data input in step S710 into the converted data so that the converted data includes only the contents of the items designated in step S720. In step S740, the separation sign 601 is inserted between the sets of data corresponding to each item. Then, in step S750, the converted data is stored in the converted-data storing unit 404 together with the data of the separation signs 601. Thereafter, in step S780, the classification unit 405 classifies the document based on the converted data obtained in step S730 or the converted-data stored in the converted-data storing unit 404. After the classification is completed, a result of the classification is stored, in step S790, in the classification-result storing unit 406, and the operation is ended.

As mentioned above, according to the first embodiment of the present invention, the document data is converted into the converted data based on the designated items, and the classification is done in accordance with the converted data. Thus, the result of the classification is prevented from being influenced by undesired items contained in the original document data. Additionally, each item in the converted data can be easily recognized by the separation sign 601 inserted between the items, which results in avoidance of confusion due to combination of the items in the converted data.

In the first embodiment of the present invention, the classification is done in accordance with the converted data itself. However, a feature vector representing a feature of the contents of the converted data may be produced from the converted data, as in the following second embodiment, so that the classification is performed by using the feature vector.

Figure 8:
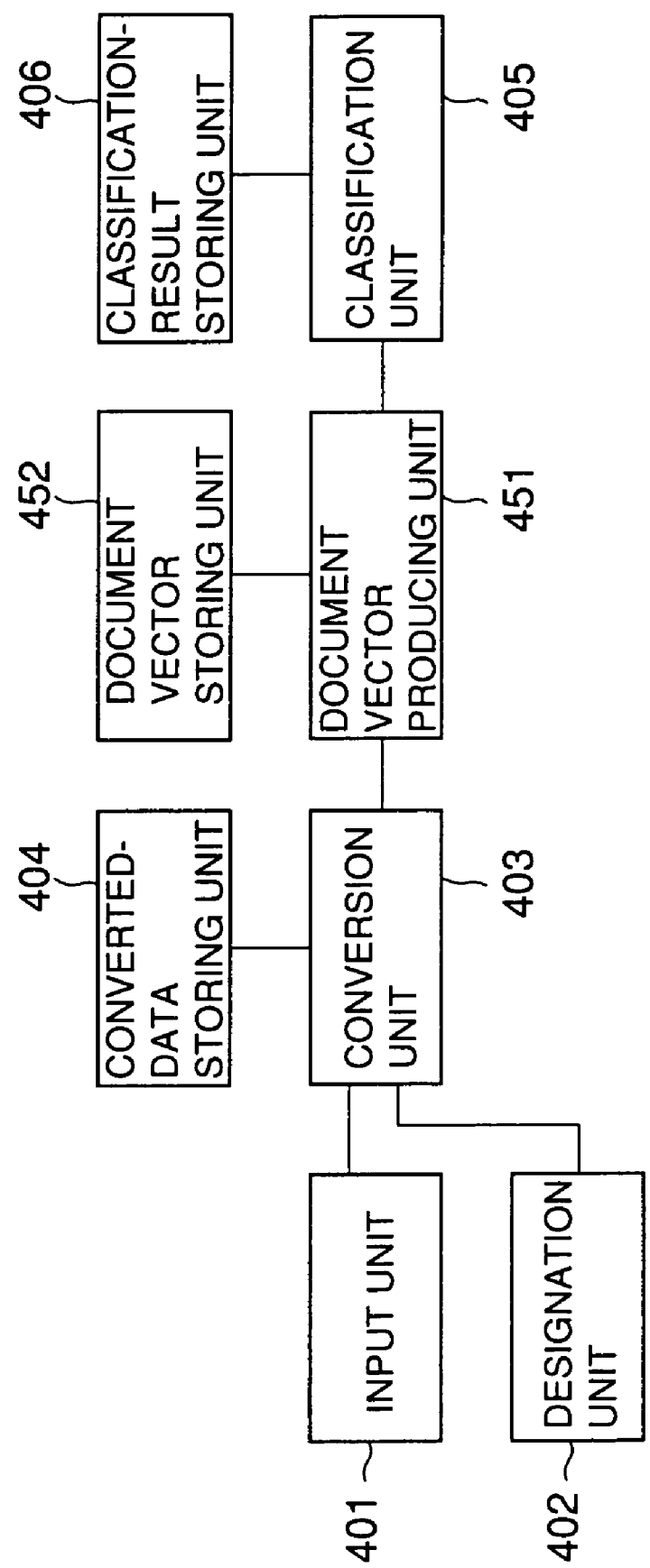
FIG. 8 is a functional block diagram of a document classification system according to a second embodiment of the present invention.

A description will now be given, with reference to FIG. 8, of the second embodiment of the present invention. FIG. 8 is a functional block diagram of a document classification system according to the second embodiment of the present invention. In FIG. 8, parts that are the same as the parts shown in FIG. 4 are given the same reference numerals, and descriptions thereof will be omitted.

The document classification system according to the second embodiment of the present invention has the same structure as that of the document classification system according to the first embodiment except for a document vector producing unit 451 and a document vector storing unit 452 being added.

The document vector producing unit 451 and the document vector storing unit 452 are achieved by the CPU 201 or 301 executing programs stored in the ROM 202 or 302, RAM 203 or 303 or the disk unit 206 or the hard disk 305.

<Document Vector Producing Unit 451>

The document vector producing unit 451 produces a feature vector of each document. In order to produce the feature vector, a natural language analysis process such as the morpheme analysis must be performed. The natural language analysis process if performed by a document analyzing unit (not show in the figure) with respect to each document data on an individual item basis. As for the morpheme analysis used in the present embodiment, a conventional morpheme analysis can be used.

The document vector producing unit 451 produces a document vector with respect each document data in accordance with a result of the analysis performed by the document analyzing unit. At this time, the document vector is produced only for a result of the analysis with respect to the items designated by the designating unit 402. The document vector in which the contents of only the items designated by the designation unit 402 are reflected can be produced by summing feature vectors that are obtained from content data of the items designated by the designation unit 402 with respect to each document data.

<Document Vector Storing Unit 452>

The document vector storing unit 452 stores the feature vector of each document data produced by the document vector producing unit 451. The feature vector varies even when it is produced from the same document data since the feature vector is dependent on the items designated by the designation unit 402. Accordingly, the each of the feature vectors are stored in the document vector storing unit 452 by each designation. When the classification is performed by the classification unit 405, the feature vectors stored in the document vector storing unit 452 are used. Thereby, the classification of the feature vector can be efficiently performed.

As for the document vector storing unit 452, the disk unit 206 of the server 101 or the hard disk 305 or the floppy disk 307 may be used according to an amount of the converted-data or an application of the converted data.

<Classification Unit 405A>

The classification unit 405A classifies the document based on similarity between the feature vectors of the converted data produced by the conversion unit 403. Specifically, the classification unit 405A classifies the document by using a known classification using a chi-square test, a discriminant analysis or a cluster analysis. In the present embodiment, any conventional method can be used as long as vector data is used for the classification.

Figure 9:
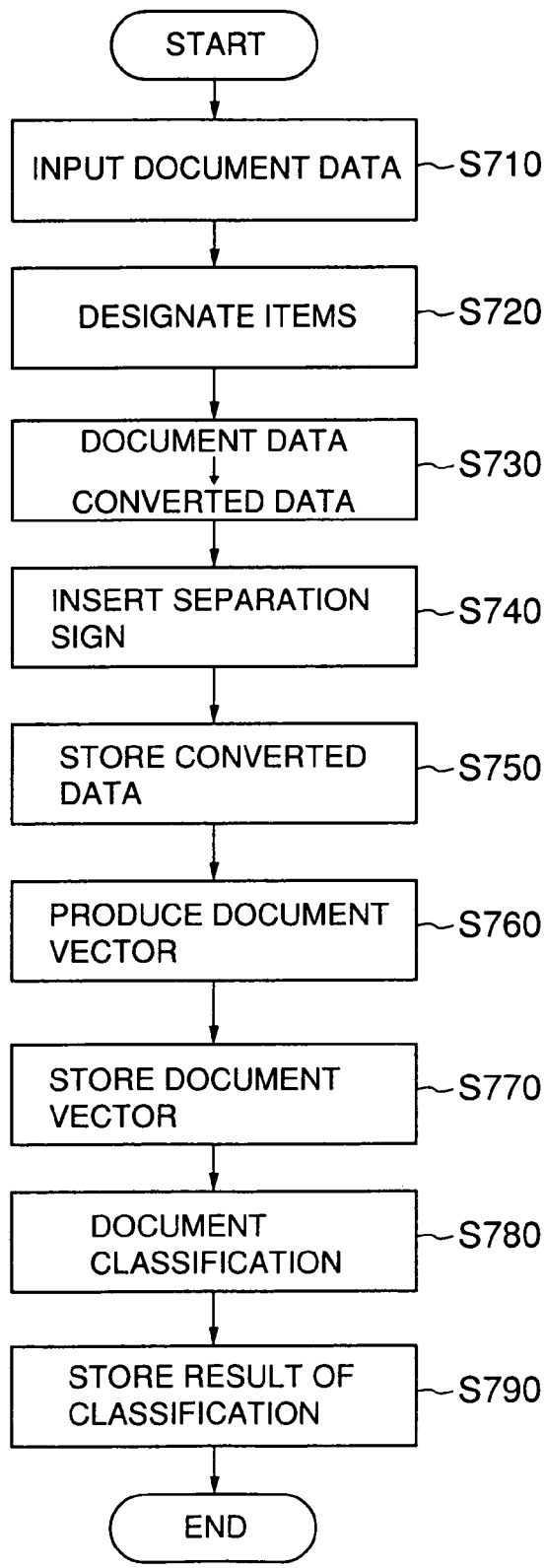
FIG. 9 is a flowchart of an operation of the document classification system according to a second embodiment of the present invention.

A description will now be given, with reference to FIG. 9, of an operation of the document classification system according to the present embodiment. FIG. 9 is a flowchart of the operation of the document classification system according to the second embodiment of the present invention. In FIG. 9, steps that are the same as the steps shown in FIG. 7 are give the same reference numerals, and descriptions thereof will be omitted.

After the process of steps S710 to S750 is completed, the document vector producing unit 801 produces, in step S760, the feature vector of each document data in accordance with the converted-data produced in step S730 or the converted data stored in step 750. In step S770, the feature vector of each document data is stored in the document vector storing unit 802. Then, in step S780, the classification unit 405A classifies the document based on the document vector produced in step S760 or the document vector stored in step S770. After the classification is completed, a result of the classification is stored in the classification-result storing unit 406 in step S790.

According to the present embodiment, since the document data is converted into the converted data in accordance with the designated items and the feature vector is produced based on the converted data of each document data, the classification can be done by using the feature vector which represents the operator's intention. Thus, the result of the classification is prevented from being influenced by undesired items contained in the original document data.

Figure 10:
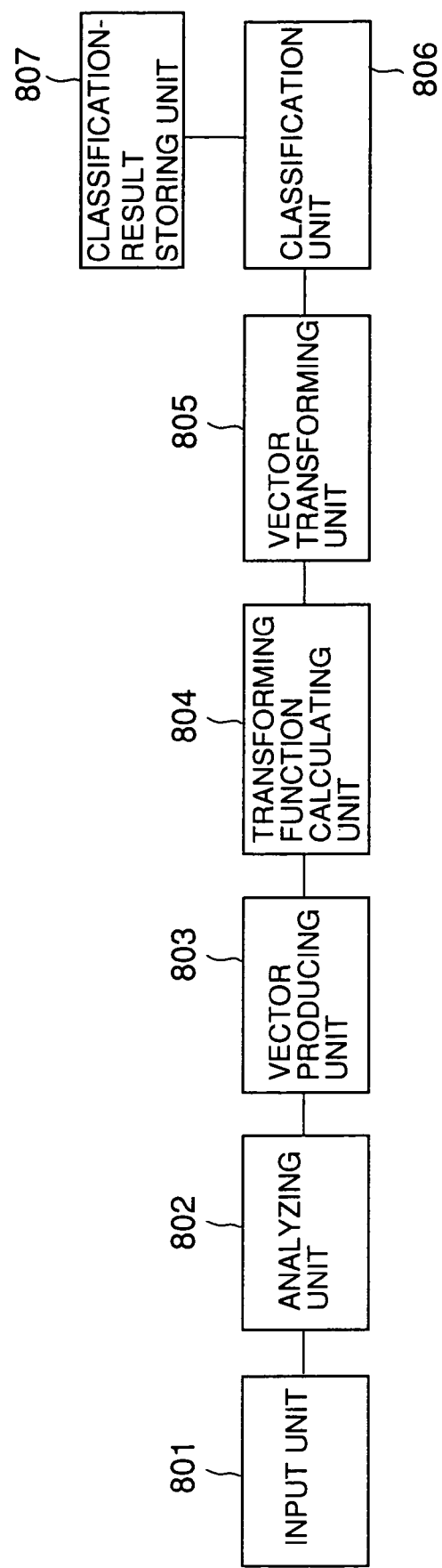
FIG. 10 is a functional block diagram of a document classification system according to a third embodiment of the present invention.

A description will now be given of a third embodiment of the present invention. FIG. 10 is a functional block diagram of a document classification system according to the third embodiment of the present invention. It should be noted that a hardware structure of the document classification system according to the third embodiment is the same as that of the document classification system according to the above-mentioned first embodiment of the present invention, and a description there of will be omitted.

As shown in FIG. 10, the document classification system according to the third embodiment of the present invention comprises an input unit 801, an analyzing unit 802, a vector producing unit 803, a transforming function calculating unit 804, a vector transforming unit 805, a classification unit 806 and a classification-result storing unit 807. A first filter (not shown in the figure) may be provided between the input unit 801 and the analyzing unit 802 so as to absorb ambiguity in description in document data output from the input unit 801. Additionally, a second filter (not shown in the figure) may be provided between the analyzing unit 802 and the vector producing unit 803 so as to remove unnecessary words or terms from an output of the analyzing unit 802. Further a third filter (not shown in the figure) may be provided between the transforming function calculating unit 804 and the vector transforming unit 805 so as to remove unnecessary words or terms from a document feature vector.

Figure 11:
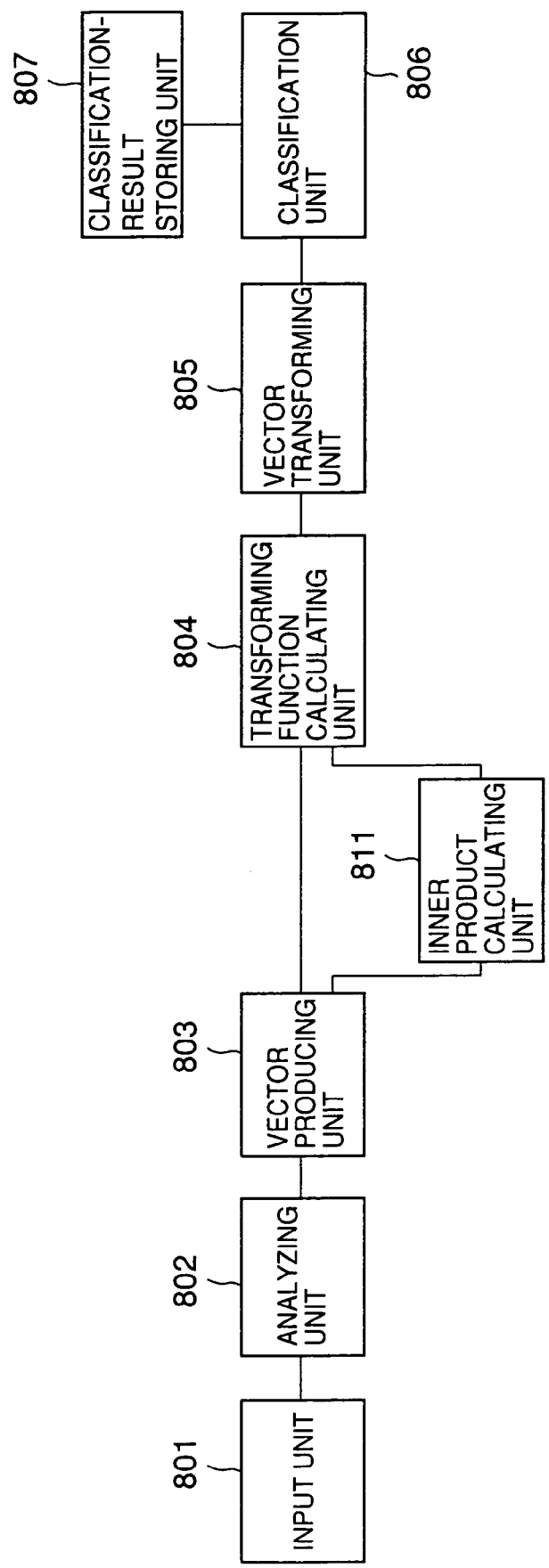
FIG. 11 is a functional block diagram of a variation of the third embodiment which variation shown in FIG. 10.
Figure 12:
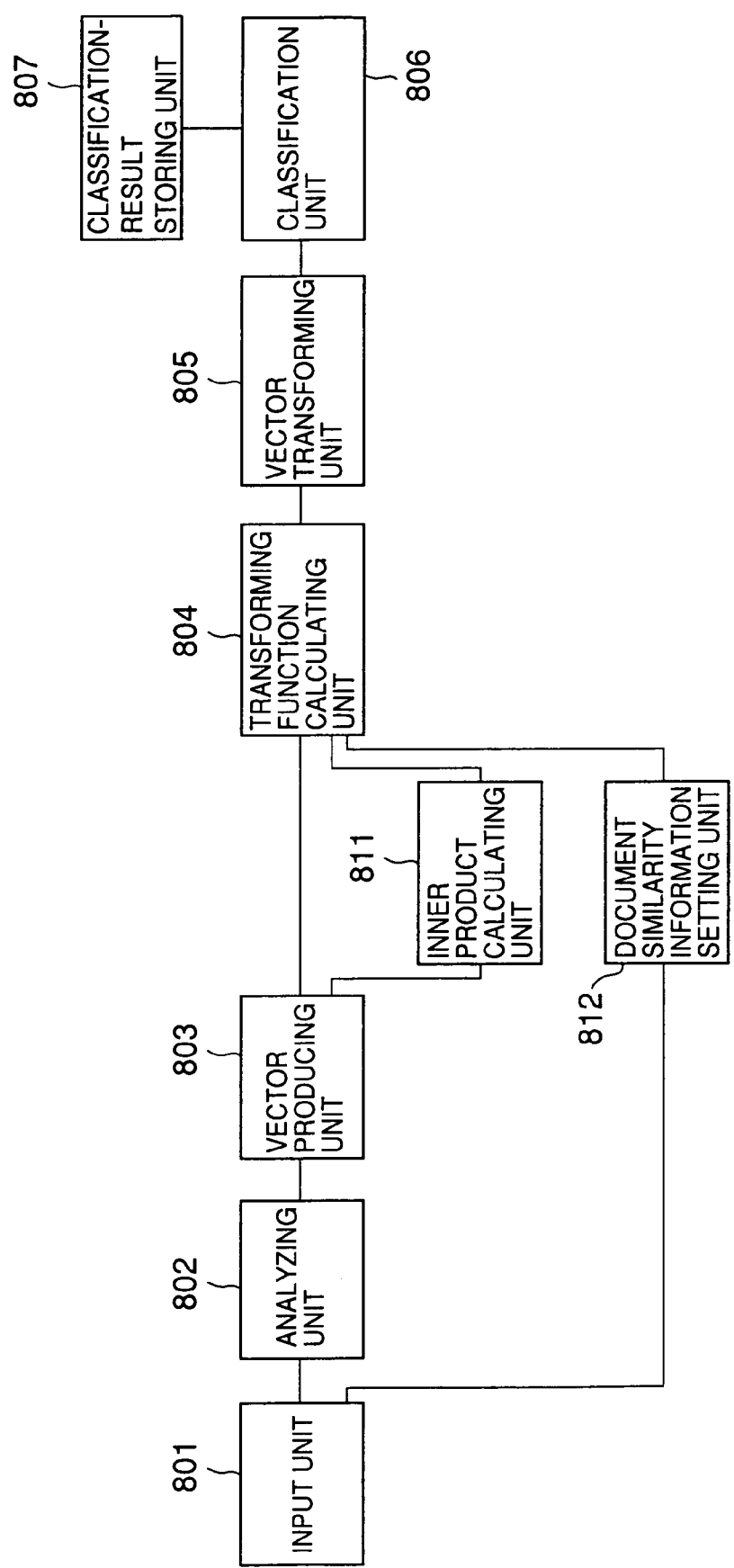
FIG. 12 is a functional block diagram of another variation of the third embodiment shown in FIG. 10.

FIG. 11 is a functional block diagram of a variation of the third embodiment which variation includes an inner product calculating unit 821. Additionally, FIG. 12 is a functional block diagram of another variation of the third embodiment which variation includes a document similarity information setting unit 831.

The input unit 801 is provided for inputting document data to be subjected to a classification process. For example, the document data is input from the keyboard 209 or 311. The document data can also be input by the scanner 313 which has an optical character reader (OCR) function. Additionally, the document data can be input from an external apparatus provided on the network 103 via the interface 204 or 309.

For example, if the document data is registered in a database recorded on a recording medium, an installation of such a recording medium into the document classification system is regarded as an input of the document data. The input unit 801 may include a document-data storing unit (not shown in the figure) for storing the input document data.

The document in the present embodiment refers to at least one sentence described by a natural language. Specifically, a patent publication or a specific newspaper article is considered to be a document. Additionally, a claim part of the patent application or a single sentence extracted from the newspaper article is also considered to be a document.

The analyzing unit 802 analyzes words or terms contained in the document data input by the input unit 801 so as to obtain analysis information. Specifically, the analyzing unit 802 performs a natural language analysis such as a morpheme analysis on the document data so as to extract words or terms from the document data. Additionally, the analyzing unit 802 provides a word identification (word ID) to each of the words so as to count a number of appearances of each word in the document or a group of sentences in the document.

The vector producing unit 803 produces a document feature vector with respect to the document data input by the input unit 801 in accordance with the analysis information obtained by the analyzing unit 802. The transforming function calculating unit 804 calculates a representation transforming function used for projecting the document feature vector produced by the vector producing unit 803 onto a space in which similarity between document feature vectors is reflected. The vector transforming unit 805 transforms the document feature vector in accordance with the representation transforming function calculated by the transforming function calculating unit 804. Operations of the vector producing unit 803, the transforming function calculating unit 804 and the vector transforming unit 805 will be described later.

The classification unit 806 classifies the document based on similarity between the document feature vectors transformed by the vector transforming unit 805. Specifically, the classification unit 405A classifies the document by using a known classification using a chi-square test, a discriminant analysis or a cluster analysis. In the present embodiment, any conventional method can be used as long as vector data is used for the classification.

The classification-result storing unit 807 stores a result of classification performed by the classification unit 806. As for the classification-result storing unit 807, the disk unit 206 of the server 101 or the hard disk 305 or the floppy disk 307 may be used according to an amount of the converted-data or an application of the converted data. Other memories such as the RAM 203 or 303 may be used for storing the result of classification.

The inner product calculating unit 811 shown in FIG. 11 calculates an inner product between the document feature vectors produced by the vector producing unit 802. A detailed description of the operation of the inner product calculating unit 811 will be provided later.

The document similarity information setting unit 812 shown in FIG. 12 sets document similarity information of the document data such as the authors' mane and a data of production of the document input by the input unit 801. The document similarity information includes information regarding an order of appearance of words in the document, date of draft of the document, date of change, name of person drafting the document, name of person correcting the document, reference documents or citations. The operator can selectively designate one or more of the items in the document similarity information.

Each of the input unit 801, the analyzing unit 802, the vector producing unit 803, the transforming function calculating unit 804, the vector transforming unit 805, the classification unit 806, the classification-result storing unit 807, the inner product calculating unit 811 and the document similarity information setting unit is achieved by the CPU 201 or the CPU 301 executing programs or application software stored in the ROM 202, the ROM 302, the disk unit 206 or the hard disk 305.

A description will now be given of the process for producing the document feature vector by the vector producing unit 803. The vector producing unit 803 produces the document feature vector of the document data in accordance with the analysis information obtained by the analyzing unit 803. The analysis information includes, for example, information regarding a words, a word ID, a frequency of appearance of a word or parts of speech of a word.

Figure 13:
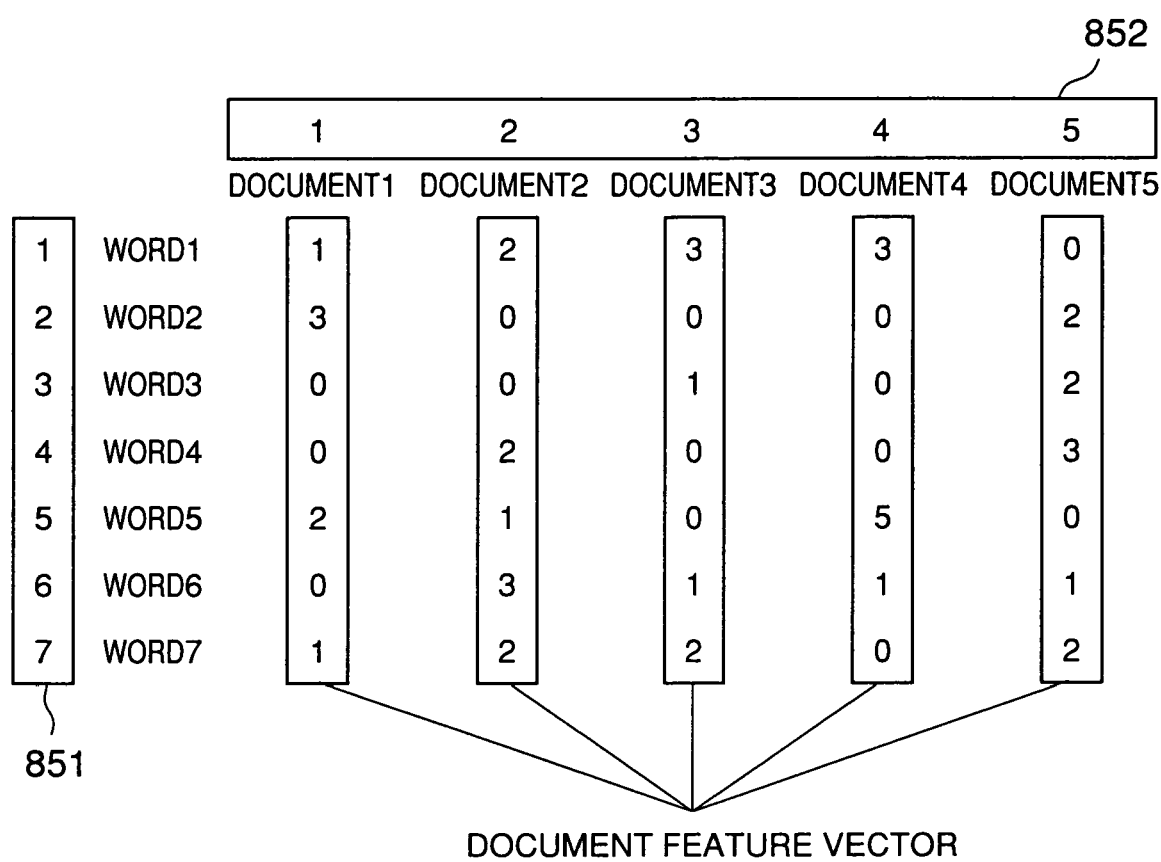
FIG. 13 is an illustration for explaining an example of matrix data of documents and words representing a document feature vector.

FIG. 13 is an illustration for explaining an example of matrix data of documents and words representing the document feature vector. In FIG. 13, a column component 851 corresponds to the word ID, and a row component 852 corresponds to the document ID. That is, the document-word matrix shown in FIG. 13 is produced in the form in which each column number represents the word ID and each row number represents the document ID so that a number obtained according to a column number and a raw number indicates a number of appearances of the corresponding word in the corresponding document. A vector represented by each column is rendered to be the document feature vector.

A process such as a normalizing can be simultaneously performed on the document feature vector. At this time, additional information such as "word"-"word ID" mapping data or "word ID"-"parts of speech of word" mapping data may be simultaneously produced. The "word"-"word ID" mapping data describes correspondence between the word ID and the corresponding word. The "word ID"-"parts of speech of word" mapping data describes the correspondence between the word ID of each word and parts of speech of the word.

A description will now be given of a process for calculating the transforming function by the transforming function calculating unit 804. The production of the document feature vector by the vector producing unit 803 is performed based on a frequency of appearance of each word in the document. At this time, it is assumed that each individual word is independent with respect to the meanings thereof, and a vector corresponding to a certain word is considered as being orthogonal to vectors corresponding to other words. However, in practice, since each word may have synonymity and polysemy, such an assumption is not always true. Accordingly, such an assumption may provide undesired influence to an accuracy of classification.

In order to reduce such influence, it is suggested to handle this problem as a multi-dimensional scale problem and use a statistical method. That is, in the transforming function calculating unit 804, the representation transforming function is calculated based on the document feature vector produced by the vector producing unit 803, the representation transforming function being used for transforming each document feature vector into a feature dimension between the document feature vectors, that is, a space in which simultaneity of words is reflected. It should be noted that the thesaurus can be used as a method for reducing influence due to synonimity of word.

In the present embodiment, as for the method for calculating the representation transforming function, a method described in the above-mentioned literature, "Representing Document Using an Explicit Model of Their Similarities", can be used. Alternatively, a factor analysis or a quantification may be used to calculate the representation transforming function.

More specifically, an inner product between the document feature vectors is calculated by the inner product calculating unit 811 so as to obtain a document similarity matrix by adding the document similarity information set by the document similarity information setting unit 812 to the inner vector. The representation transforming function is calculated based on the thus-produced document similarity matrix and the document feature vector. By using the representation transforming function, the document classification can be performed in the presentation space in which similarity in meanings between documents is strongly reflected. Additionally, since the operator can freely select the document similarity information, the document classification in which the operator's intention is well reflected can be performed.

Specifically, the representation transforming function W is represented by the following equation (1), where d is a number of documents, t is a number of words, X is a document-word matrix having a size t×d, S is a matrix of inner product between documents having a size of d×d, S is an additional document similarity information matrix having a size of d×d.

$$W = M^T C X^+ \quad (1)$$

It should be noted that "$^T$" indicates a transposition of a matrix. If an operator for applying a singular value decomposition is represented by svd( ), the matrix C, M and X+ becomes as follows.

$$X = svd(X) = U L A^T \quad (2)$$

$$S = X^T X \quad (3)$$

$$S + S_a = svd(S + S_a) = C^T C \quad (4)$$

$$C A A^T = svd(C A A^T) = M Z N^T \quad (5)$$

$$X^+ = A L^{-1} U^T \quad (6)$$

In order to calculate the representation transforming function by using an inner product of vectors, the above-mentioned additional document similarity matrix $S_a$ is rendered to be an empty matrix. In such a case, the representation transforming function becomes as follows.

$$W = U^T \quad (7)$$

Additionally, in order to calculate the representation transforming function by using the document similarity information, the above-mentioned additional document similarity matrix $S_a$ is rendered to be a symmetric matrix other than the empty matrix.

Further, in the document classification system according to the present embodiment, the transforming function calculating unit 804 can be bypassed by rendering the representation transforming function to be an identity matrix having a size of t×t.

Since the number of feature dimensions of the document feature vector produced by the vector producing unit 803 is equal to the number of words that appear in the group of documents, the number of feature dimensions normally becomes extremely large. Accordingly, an extremely large calculation cost and memory space are required if a classification is done without change. In order to reduce the number of feature dimensions, words that appears very frequently or words that rarely appear may be excluded. However, such a method may deteriorate accuracy of classification.

However, the representation transforming function according to the present embodiment achieves the transformation into a space in which simultaneity of words between the document feature vectors is considered. Thereby, apparent from the equation (1), each feature dimension of the presentation space produced by the representation transforming function can be represented as a one-dimensional combination of a plurality of words. Accordingly, a large number of words can be handled with a less number of feature dimensions. Thus, a calculation cost and a memory space for classification can be reduced.

A description will now be given of the transformation of the document feature vector by the vector transforming unit 805. The vector transforming unit 805 transforms the document feature vector by using the representation transforming function calculated by the transforming function calculating unit 804 so as to obtain data to be subjected to the classification. Additionally, each word can be transformed by using the representation transforming function. That is, when the matrix W is used as the representation transforming function, the transformed document feature vector $D_P$ is represented by the following equation (8).

$$D_P = WX \tag{8}$$

Additionally, a matrix representation TP of the transformed word can be represented by the following equation (9), where I is an identity matrix.

$$T_P = W^T I = W \tag{9}$$

Figure 14:
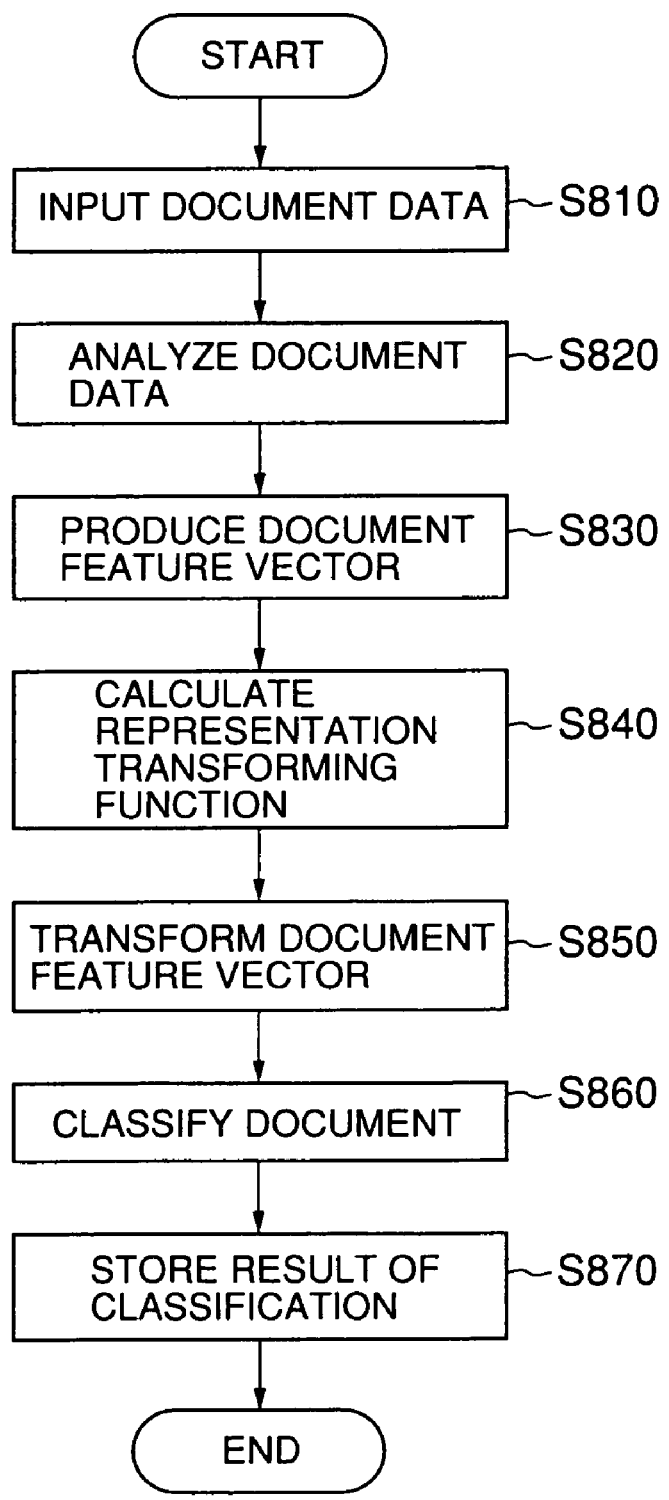
FIG. 14 is a flowchart of an operation of the document classification system according to the third embodiment of the present invention.

A description will now be given of an operation of the document classification system according to the third embodiment of the present invention. FIG. 14 is a flowchart of the operation of the document classification system according to the third embodiment of the present invention.

When the operation shown in FIG. 14 is started, the input unit 801 input the document data in step S810. Then, in step S802, the analyzing unit 802 analyzes the document data input in step S810 so as to obtain the analysis information. Thereafter, in step S830, the vector producing unit 403 produces the document vector based on the analysis information obtained in step S820. In step S840, the transforming function calculating unit 804 calculates the representation transforming function which is used for projecting the document feature vector onto a space in which similarity between the document feature vectors is reflected. After that, in step S850, the vector transforming unit 805 transforms the document vector produced in step S830 by using the representation transforming function calculated in step S840. Then, in step S860, the classification unit 806 classifies the document in accordance with the similarity between the document feature vectors transformed in the step S850. Thereafter, in step S870, a result of the classification is stored in the classification-result storing unit 807, and the operation is ended.

Figure 15:
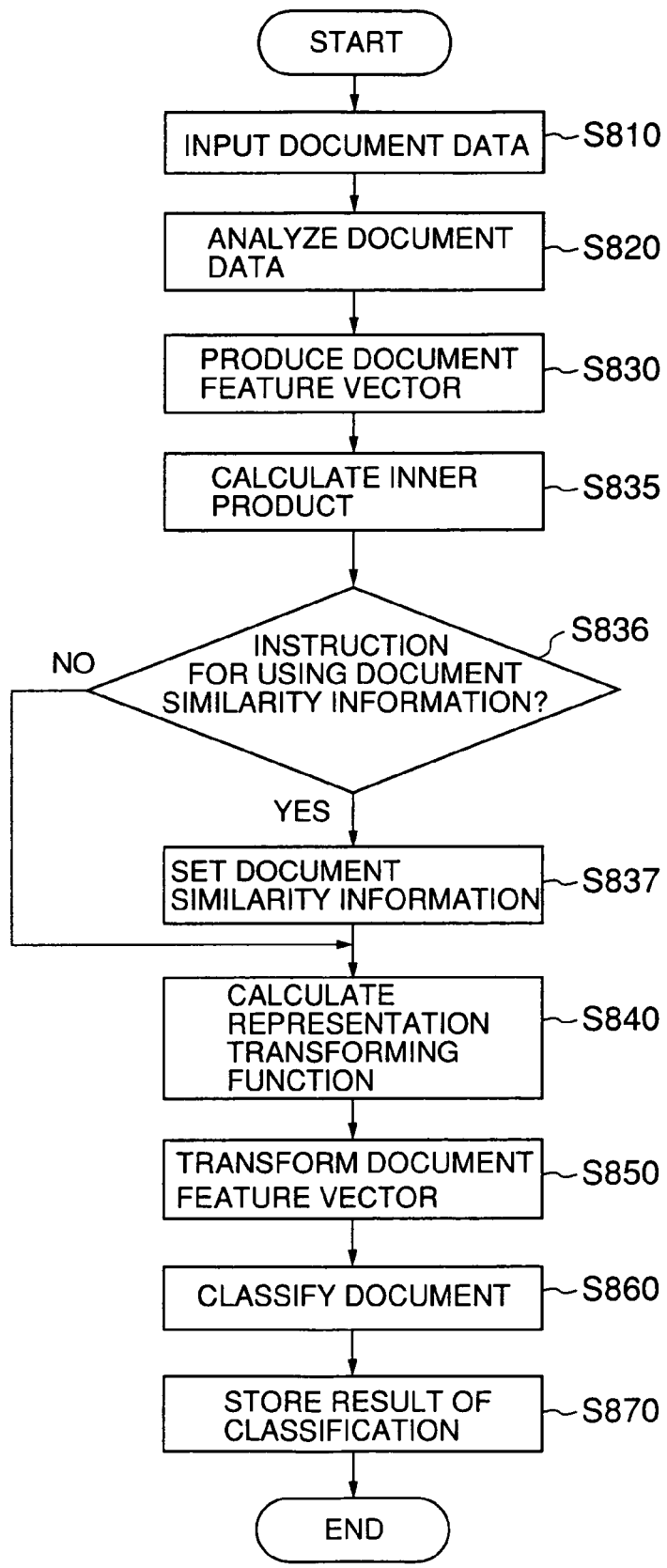
FIG. 15 is a flowchart of another operation performed by the document classification system according to the third embodiment of the present invention.

FIG. 15 is a flowchart of another operation performed by the document classification system according to the third embodiment of the present invention. In FIG. 15, steps that are the same as the steps shown in FIG. 14 are given the same step numbers, and descriptions thereof will be omitted.

In the operation shown in FIG. 15, subsequent to step S830, an inner product of the document feature vectors produced in step S830 is calculated in step S853. Then, it is determined, in step 836, whether or not an instruction for using the document similarity information is made. If there is not such an instruction, the routine proceeds to step S840 so as to calculate the representation transforming function by using the inner product calculated in step S835. On the other hand, if there is an instruction to use the document similarity information, the routine proceeds to step S837 so as to set the document similarity information with respect to the document data input by the input unit 801. Thereafter, the routine proceeds to step S840 so as to calculate the representation transforming function by using the inner product calculated in step 835 and the document similarity information set in step 837. Thereafter, the same process as that shown in FIG. 14 is performed.

As mentioned above, according to the third embodiment of the present invention, the representation transforming function is calculated based on similarity between documents in a group of documents to be subjected to classification, the representation transforming function being used for transforming each document data into a presentation space in which relationship between the meanings of the documents can be reflected. Since the document classification is performed in the thus-obtained presentation space, the document classification in which operator's intention is reflected can be achieve.

A description will now be given of a fourth embodiment of the present invention.

In the above-mentioned third embodiment according to the present invention, there is no description with respect to storage of the document feature vector and the representation transforming function. In the fourth embodiment of the present invention, a vector storing unit and a transforming function storing unit are added.

Figure 16:
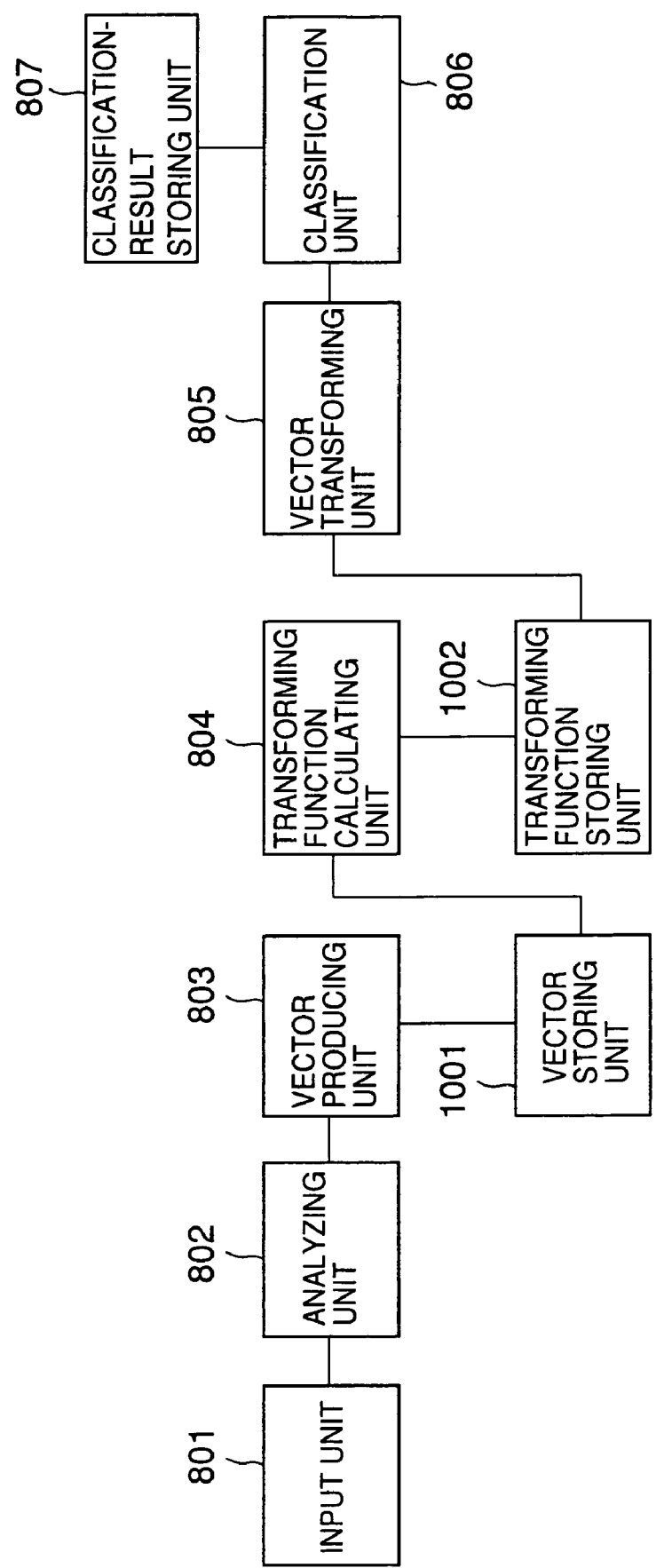
FIG. 16 is a functional block diagram of a document classification system according to a fourth embodiment of the present invention.

FIG. 16 is a functional block diagram of a document classification system according to the fourth embodiment of the present invention. In FIG. 16, parts that are the same as the parts shown in FIG. 10 are given the same reference numerals, and descriptions thereof will be omitted.

In FIG. 16, a vector storing unit 1001 stores the document feature vector produced by the vector producing unit 803. The vector storing unit 1001 also stores additional information simultaneously produced by the vector producing unit 803. The additional information may includes "word"-"word ID" mapping data or "word ID"-"parts of speech of word" mapping data. The "word"-"word ID" mapping data describes correspondence between the word ID and the corresponding word. The "word ID"-"parts of speech of word" mapping data describes the correspondence between the word ID of each word and parts of speech of the word.

Additionally, a transforming function storing unit 1002 stores the representation transforming function produced by the transforming function calculating unit 804.

Each of the vector storing unit 1001 and the transforming function storing unit 1002 can be achieved by performing a process instructed by the CPU 201 or 301 according to programs stored in the ROM 202 or 302, the RAM 203 or 303, the disk unit 206 or the hard disk drive 304.

By storing the document feature vector and the representation transforming function, the stored document feature vector can be transformed by using the stored representation transforming function. Accordingly, there is no need to continuously perform the processes of the vector storing unit 1001 and the transforming function storing unit 1002 and the process of the vector transforming unit 805. Thus, the vector storing unit 1001 and the transforming function storing unit 1002 can be functionally separated from each other.

Figure 17:
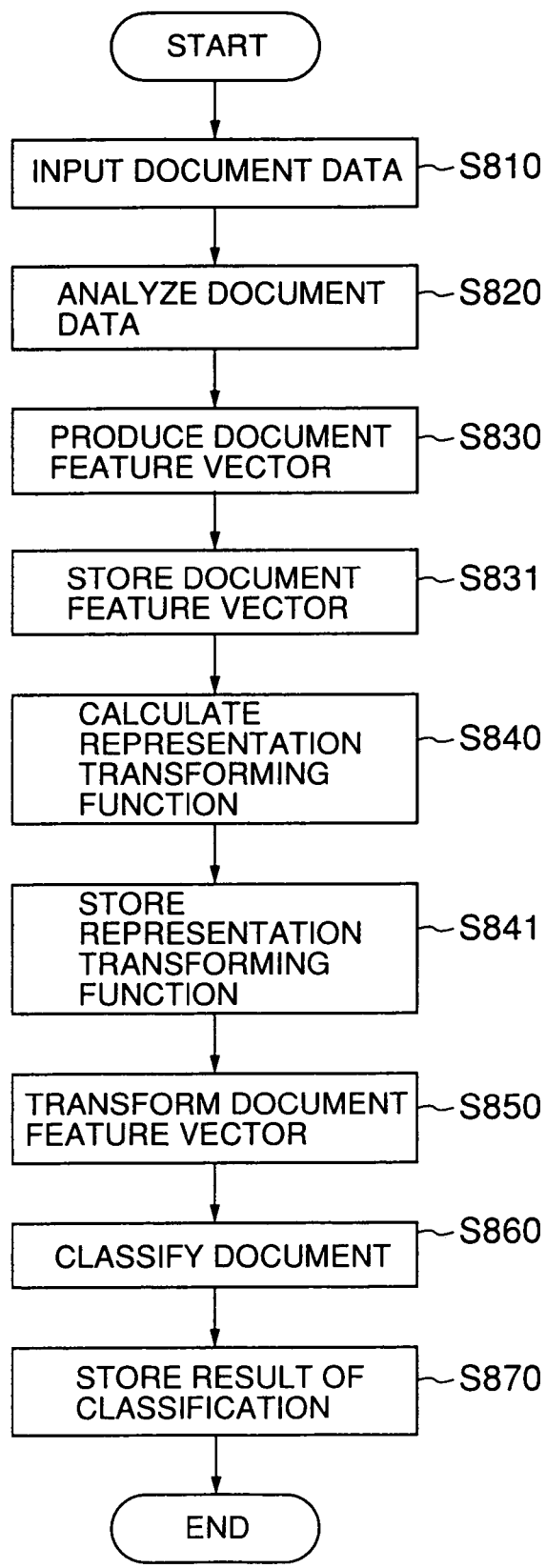
FIG. 17 is a flowchart of an operation performed by a document classification system according to the fourth embodiment of the present invention.

A description will now be given of an operation performed be the document classification system according to the fourth embodiment of the present invention. FIG. 17 is a flowchart of the operation performed by the document classification system according to the present invention. In FIG. 17, steps that are the same as the steps shown in FIG. 14 are given the same step number, and descriptions thereof will be omitted.

In FIG. 17, after the process of step S380 is completed, the routine proceeds to step S831 in which the document feature vector is stored in the vector storing unit 1001. Thereafter, the routine proceeds to step S840, and subsequently to step S841. In step S841, the representation transforming function calculated in step S840 is stored in the transforming function storing unit 1002. Thereafter, the process the same as that of the third embodiment is performed.

As mentioned above, the document classification system according to the fourth embodiment of the present invention can perform the document classification without calculating the representation transforming function each time the number of categories or the method of classification is changed. Accordingly, results of a plurality of classifications can be obtained in a short time.

Additionally, the representation transforming function can be previously calculated based on other document feature vectors.

A description will now be given of a fifth embodiment of the present invention. According to the fifth embodiment, a vector correcting unit 1201 is added to the structure of the above-mentioned third or fourth embodiment.

Figure 18:
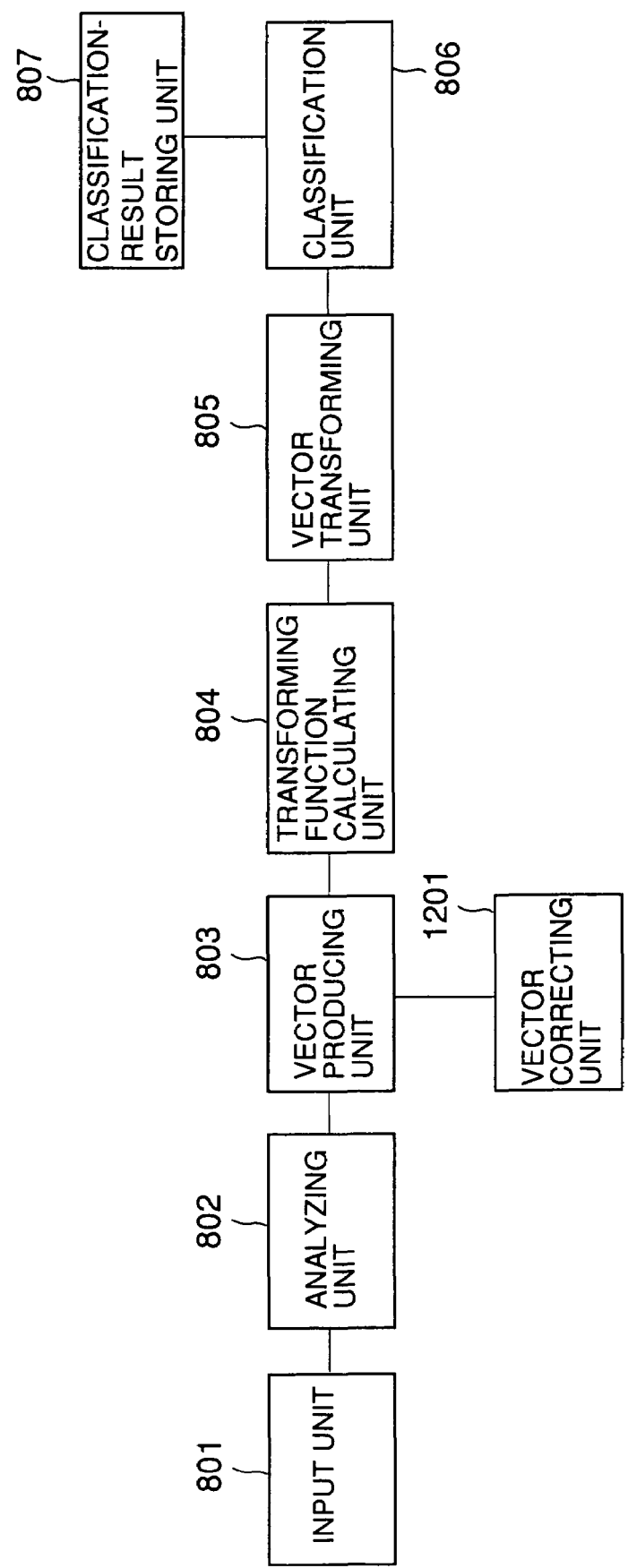
FIG. 18 is a functional block diagram of a document classification system according to a fifth embodiment of the present invention.

FIG. 18 is a functional block diagram of a document classification system according to the fifth embodiment of the present invention. In FIG. 18, parts that are the same as the parts shown in FIG. 10 are given the same reference numerals, and descriptions thereof will be omitted.

In FIG. 18, the vector correcting unit 1201 is connected to the vector producing unit 803. The vector correcting unit 1201 corrects the document feature vector produced by the vector producing unit 803 before the document feature vector is transformed by the vector transforming unit 805. The correction is performed according to a rule created by characteristic of words extracted by the analyzing unit 802 so as to one or both of the document feature vector and the feature dimension constituting the document feature vector.

Figure 19:
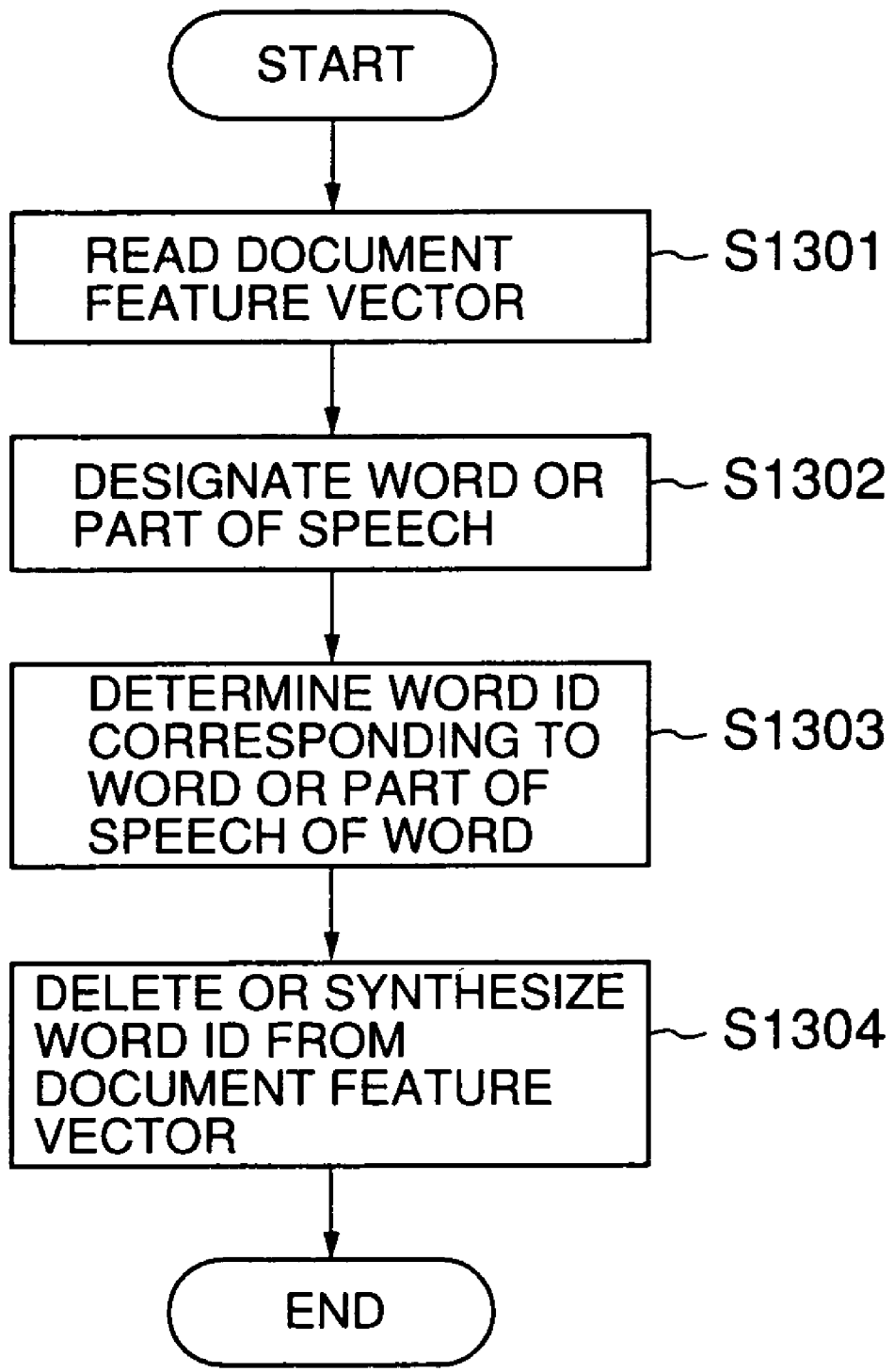
FIG. 19 is a flowchart of a process performed by a vector correcting unit shown in FIG. 18.

FIG. 19 is a flowchart of a process performed by the vector correcting unit 1201 shown in FIG. 18. In step 1301, the vector correcting unit 1201 reads the document feature vector. In step S1302, a designation is made to the words extracted by the analyzing unit 802 or information regarding parts of speech of each of the words. Then, in step S1302, the feature dimensions of the document feature vector that are to be subjected to a process such a deletion is determined. That is, the word ID of words uniquely appear in the group of documents are determined.

Thereafter, in step S1304, the feature dimension of the document feature vector produced by the vector producing unit 803 or the feature vector stored in the vector storing unit 1001 is subjected to the process such as deletion or composition so as to produce a composite (or corrected) document feature vector.

The vector correcting unit 1201 can be achieved by performing a process instructed by the CPU 201 or 301 according to programs stored in the ROM 202 or 302, the RAM 203 or 303, the disk unit 206 or the hard disk drive 304.

Figure 20:
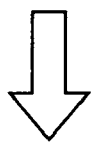
FIG. 20 is an illustration for explaining a process for deleting feature dimensions from a document feature vector.

FIG. 20 is an illustration for explaining a process for deleting t' feature dimensions (corresponding to word IDs) from the document feature vector. The document feature vector X' corrected by the vector correcting unit 1201 is represented by the following equation (10), where the d is a number of documents, t is a number of words, X is a matrix corresponding to the document feature vector (a matrix of documents and frequency of words) having a size of t×d, and $P_t$ is a matrix made by deleting the rows corresponding to the word ID designated by an identity matrix having a seize of t×t, and if the number of rows deleted is (t–t'), then $P_t$ has a size of t×t'

$$X' = P_t X \quad (10)$$

Figure 21:
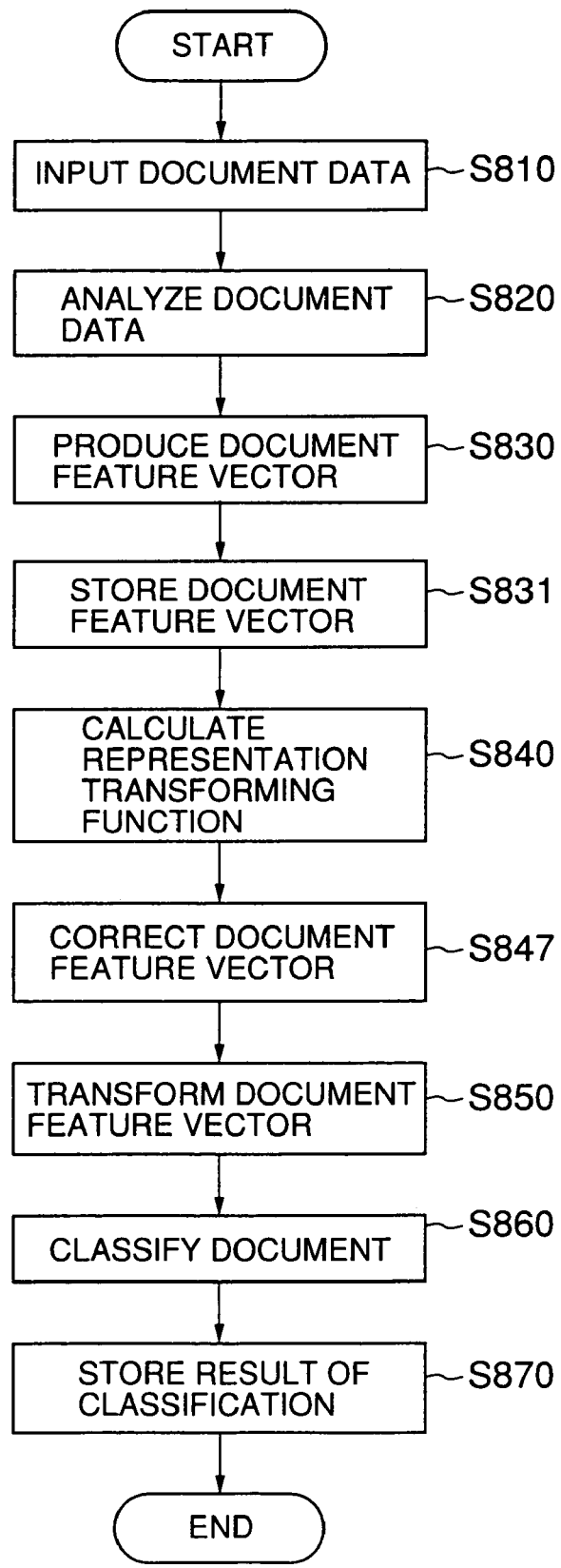
FIG. 21 is a flowchart of an operation performed by the document classification system according to the fifth embodiment of the present invention.

A description will now be given of an operation of the document classification system according to the fifth embodiment of the present invention. FIG. 21 is a flowchart of the operation performed by the document classification system according to the fifth embodiment of the present invention. In FIG. 21, steps that are the same as the steps shown in FIG. 17 are give the same step numbers, and description thereof will be omitted.

In the operation shown in FIG. 21, after the process of step S830 is completed, the routine proceeds to step S847. In step S847, the document feature vector produced by the vector producing unit 803 is corrected by the vector correcting unit 1201. Thereafter, the routine proceeds to step S850, and the process the same as that of the third embodiment is performed.

As mentioned above, in the document classification system according to the fifth embodiment of the present invention, words determined to be unnecessary for classification can be deleted by the vector correcting unit 1201 after the document feature vector is produced by the vector producing unit 403. Additionally, classification can be performed after by deletion of different words for each category by the vector correcting unit 1201 while classification can be done efficiently with respect to the same document feature vector.

A description will now be given of a sixth embodiment of the present invention. Although the vector correcting unit 1201 is added in the fifth embodiment, a transforming function correcting unit 1601 may be further added as is in the sixth embodiment of the present invention.

Figure 22:
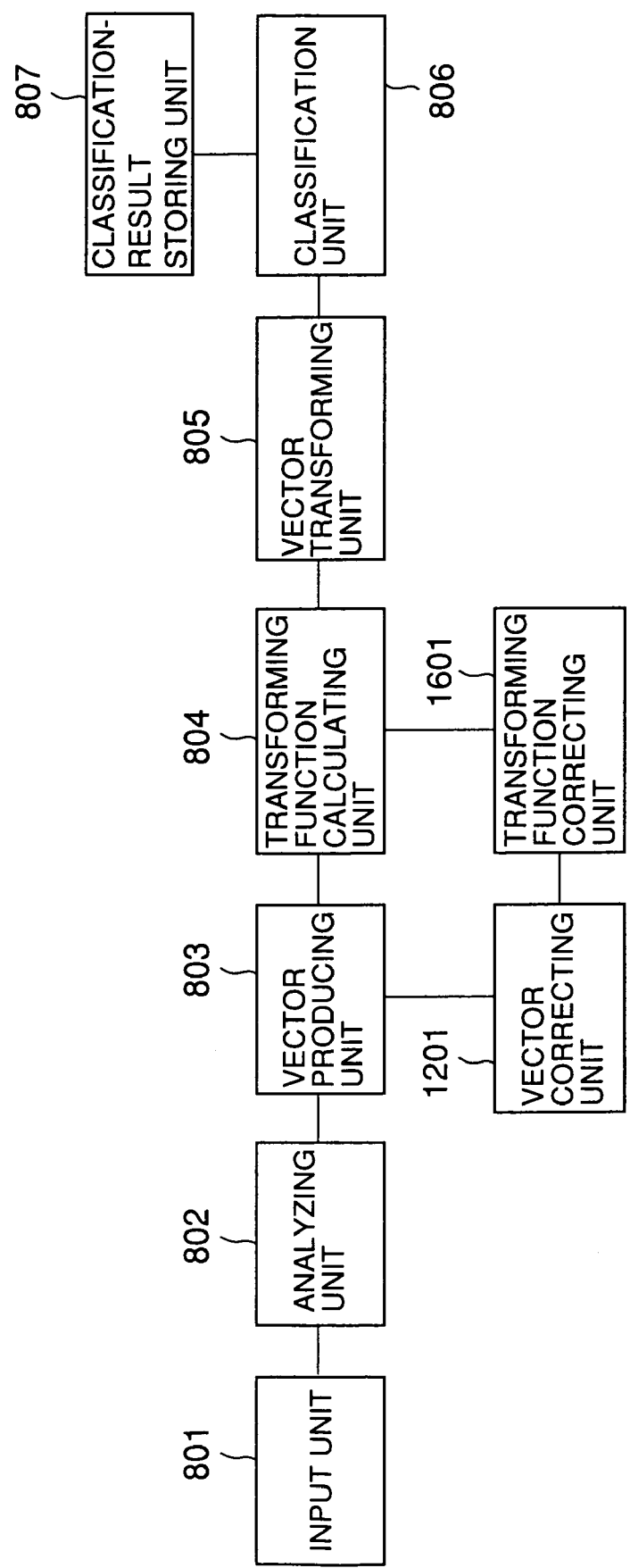
FIG. 22 is a functional block diagram of a document classification system according to a sixth embodiment of the present invention.

A description will now be given of a structure of a document classification system according to the sixth embodiment of the present invention. FIG. 22 is a functional block diagram of the document classification system according to the sixth embodiment of the present invention. In FIG. 22, parts that are the same as the parts shown in FIG. 18 are given the same reference numerals, and descriptions thereof will be omitted.

In the above-mentioned fifth embodiment, the representation transforming function is calculated based on the document feature vector before correction when the document feature vector is corrected by the vector correcting unit 1201. Accordingly, there is a possibility that the effect of correction to the document feature vector is reduced unless the effect of correction to the document feature vector is reflected in the representation transforming function. Accordingly in the sixth embodiment, the representation transforming function is corrected based on the corrected document feature vector.

That is, the transforming function correcting unit 1601 corrects the representation transforming function W to a corrected representation transforming function W'. It should be noted that the representation transforming function W is given by the above-mentioned equation (7) when the representation transforming function is calculated based on the inner product of the document feature vectors. At this time, the corrected representation transforming function is represented by the following equation (11) by using the equations (2), (7) and (10).

$$W' = L^{-1} U^T P_t X (P_t X) \quad (11)$$

The transforming function correcting unit 1601 can be achieved by performing a process instructed by the CPU 201 or 301 according to programs stored in the ROM 202 or 302, the RAM 203 or 303, the disk unit 206 or the hard disk drive 304.

Figure 23:
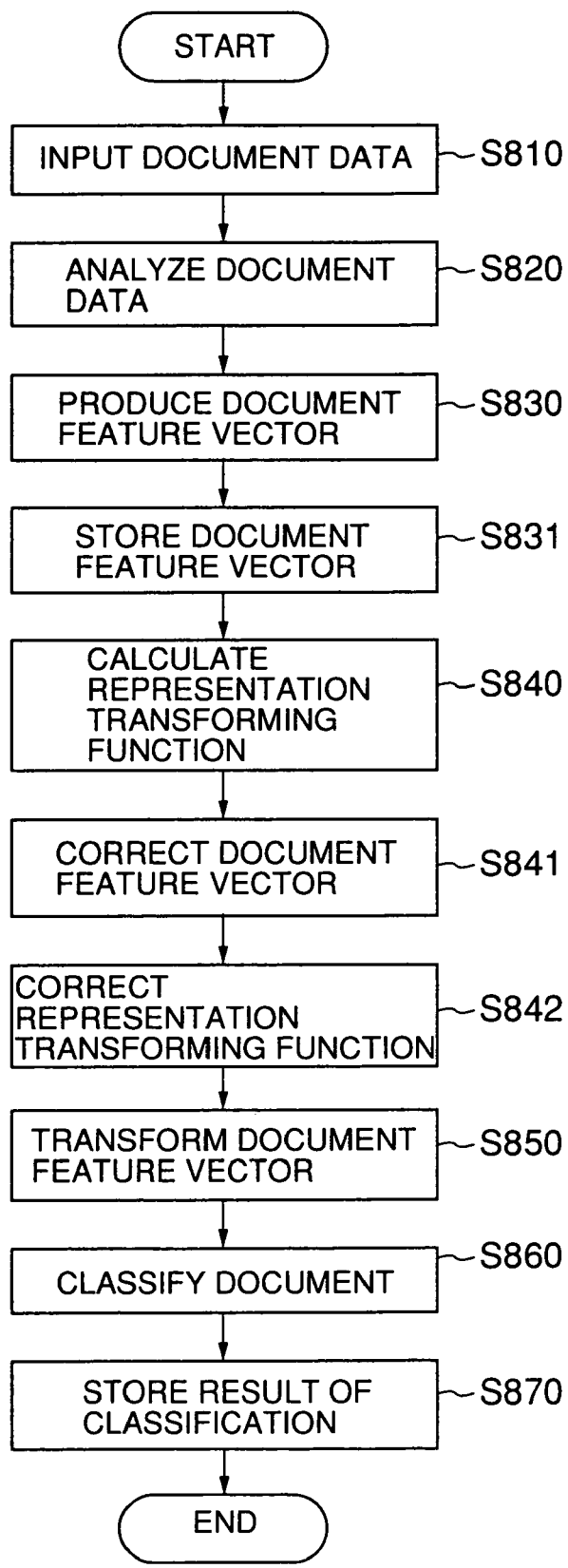
FIG. 23 is a flowchart of an operation performed by the document classification system according to the sixth embodiment of the present invention.

FIG. 23 is a flowchart of an operation performed by the document classification system according to the sixth embodiment of the present invention. In the operation shown in FIG. 23, when a correction is made to the document feature vector, the representation transforming function is also corrected in step S841. The rest of the process is the same as that of the above-mentioned fifth embodiment.

As mentioned above, in the document classification system according to the sixth embodiment of the present invention, the presentation space transformation vector can be corrected in relation to the correction of the document feature vector. Accordingly, a more appropriate transformation of the document feature vector can be achieved.

A description will now be given of a seventh embodiment of the present invention.

In the above-mentioned sixth embodiment, the transforming function correcting unit 1601 is added. In the seventh embodiment of the present invention, a transforming function correction instructing unit 1801 is further added to the structure of the sixth embodiment so as to send an instruction to the transforming function correcting unit 1601.

Figure 24:
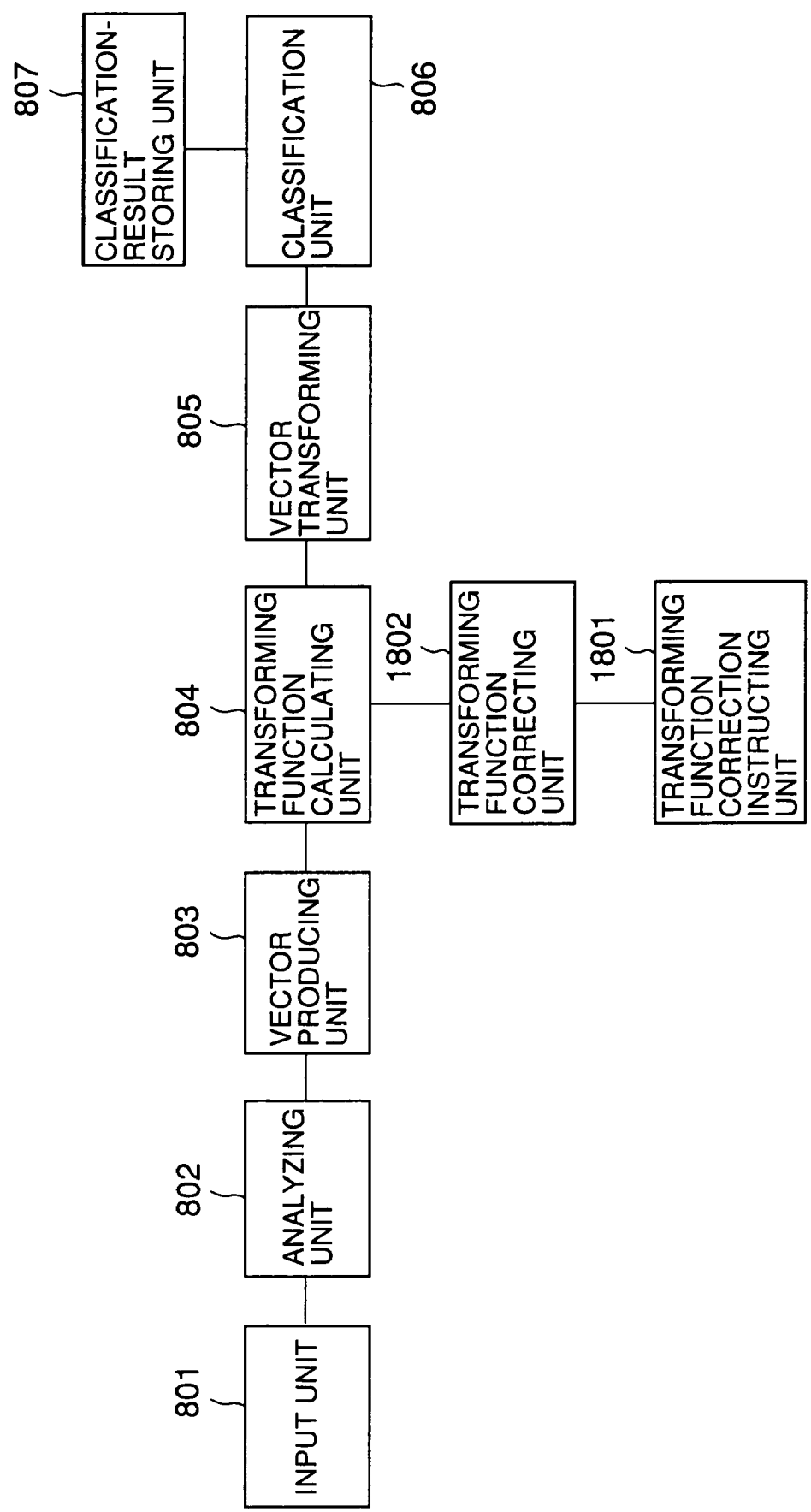
FIG. 24 is a functional block diagram of a document classification system according to a seventh embodiment of the present invention.

A description will now be given of a functional structure of a document classification system according to the seventh embodiment. FIG. 24 is a functional block diagram of the document classification system according to the seventh embodiment of the present invention. In FIG. 24, parts that are the same as the parts shown in FIG. 10 are given the same reference numerals, and descriptions thereof will be omitted.

In FIG. 24, a transforming function correction instructing unit 1801 sends an instruction with respect to a process applied to a feature dimension of the representation transforming function. A transforming function correcting unit 1802 processes the feature dimension of the representation transforming function based on the contents of the instruction sent from the transforming function correcting unit 1801 so as to correct the representation transforming function.

Each of the transforming function correction instructing unit 1801 and the transforming function correcting unit 1802 can be achieved by performing a process instructed by the CPU 201 or 301 according to programs stored in the ROM 202 or 302, the RAM 203 or 303, the disk unit 206 or the hard disk drive 304.

In the transforming function correction instructing unit 1801, as one of the method for performing document classification in which operator's intention is reflected, feature dimensions that are unnecessary or provide undesired influences in a space constituted by the representation transforming function may be deleted or synthesized, or some dimensions may be enhanced.

However, since the feature dimensions of the space produced by the representation transforming function are considered to be a combination of a plurality of words extracted by the analyzing unit 802 which words have similar meanings. Accordingly, interpretation of meanings indicated by each feature dimension is extremely complex and ambiguous. Thus, it is difficult to present the meaning of each feature dimension to the operator.

In the present embodiment, the operator can designate information regarding documents or words having contents that are not desirous to be reflected in the classification. The thus designate information is appropriately projected onto the space constituted by the representation transforming function so as to discriminate feature dimensions having higher similarity or lower similarity, and, thereby, feature dimensions to be processed can be selected.

In the present embodiment, as an example of such an operation for processing a feature dimension by the representation transforming function, a feature dimension having higher similarity with respect to a document designated by the operator is deleted. Specifically, a document designated by the operator is represented by a vector (document vector) having the same number of dimensions with the document feature vector. The representation transforming function is applied to the document vector so as to project the document vector onto the space constituted by the representation transforming function. Similarity between the thus-projected document vector and each of the feature dimensions is calculated so as to discriminate feature dimensions having higher similarity.

As for a measure for determining the similarity, a cosine measure, an inner product measure or a Euclid distance measure may be used. As for the discrimination, there is a method in which the discrimination is made according to a threshold value so that the one having similarity higher than a threshold value is rendered to be an object to be deleted. Alternatively, a predetermined number of dimensions having higher similarity in an descending order from the highest similarity may be rendered to be objects to be deleted. Additionally, a discriminant analysis method may be used.

As mentioned above, the representation transforming function can be corrected by deleting the thus-selected feature dimensions from the representation transforming function. At this time, any information can be applicable as long as the information is represented by a vector having the same number of dimensions as the document feature vector.

As for the information designated by the operator, document other than the documents to be classified may be used as one which is easily understandable by the operator, the document being represented by a vector having the same dimensions as the document feature vector. Additionally, the document feature vector may be used as information which can be designated by the operator.

Additionally, as for the information designated by the operator, words extracted by the analyzing unit 802 or input by the operator or information regarding parts of speech of the words may be used. Further, a classification representative/typical information which is a result of classification previously performed and stored in the classification-result storing unit 807 may be used.

The above-mentioned designation information can be used alone or in combination with other designation information.

Figure 25:
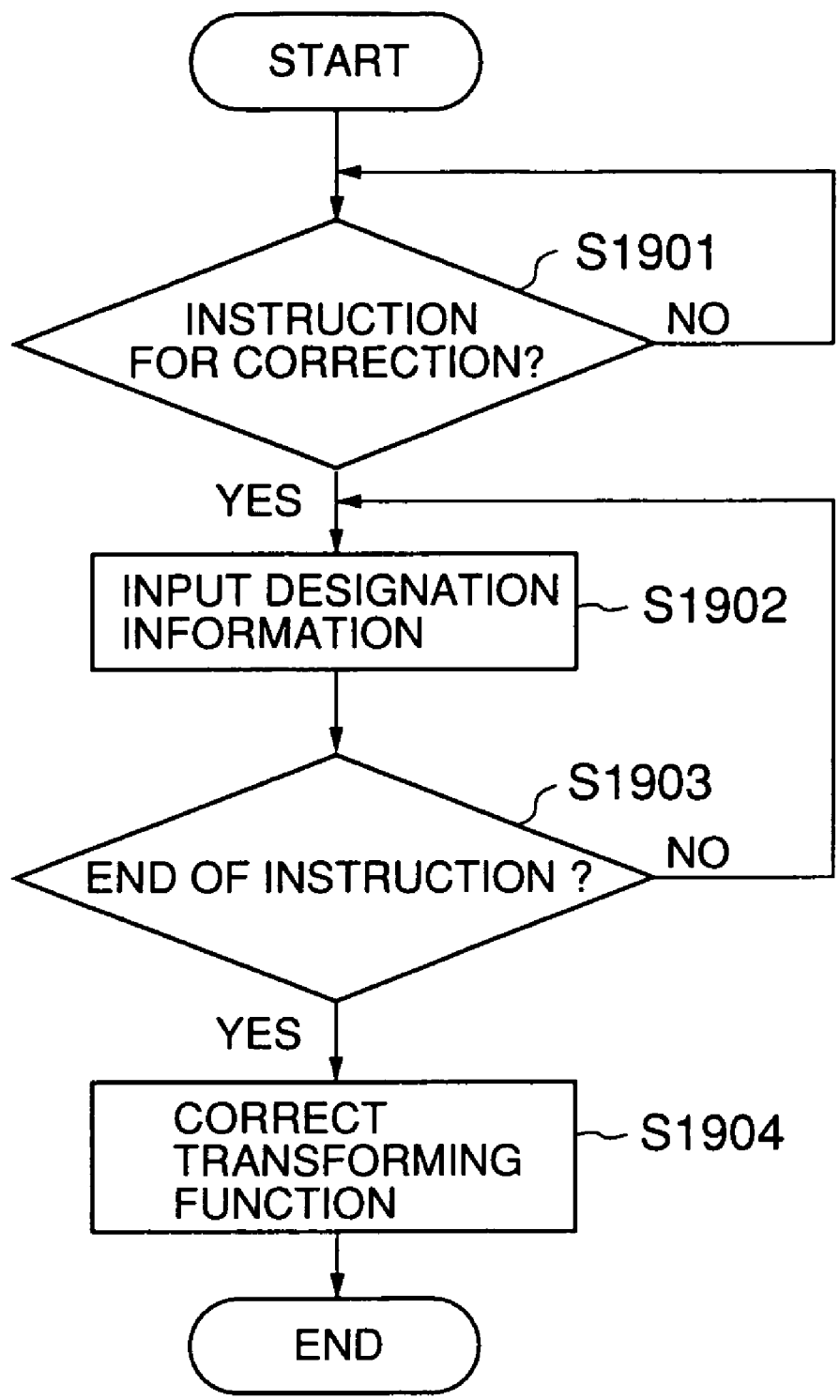
FIG. 25 is a flowchart of an operation performed by the document classification system according to the seventh embodiment of the present invention.

FIG. 25 is a flowchart of a process performed by the transforming function correction instructing unit 1801 and the transforming function correcting unit 1802 shown in FIG. 24. When the operation shown in FIG. 25 is started, it is determined, in step S1901, whether or not there is an instruction for correction of the representation transforming function. If there an instruction for correction of the representation transforming function is made, the routine proceeds to step S1902. In step S1902, the designation information designated by the operator is input. It is then determined, in step S1903, whether or not the inputting operation of the designation information is completed. If the inputting operation is not completed, the routine returns to step S1903. If it is determined, in step S1903, that the inputting operation is completed, the routine proceeds to step S1904. In step S1904, the representation transforming function is corrected based on the input instruction information.

As mentioned above, according to the present embodiment, the document classification in which operators intention is reflected can be performed by the operator performing a simple operation with respect to the feature dimensions of a space constituted by the representation transforming function.

A description will now be given of an eighth embodiment of the present invention. According to the eighth embodiment, an initial cluster centroid designating unit 2001 and an initial cluster centroid registering unit 2002 are added to the structure of the above-mentioned third to sixth embodiments.

Figure 26:
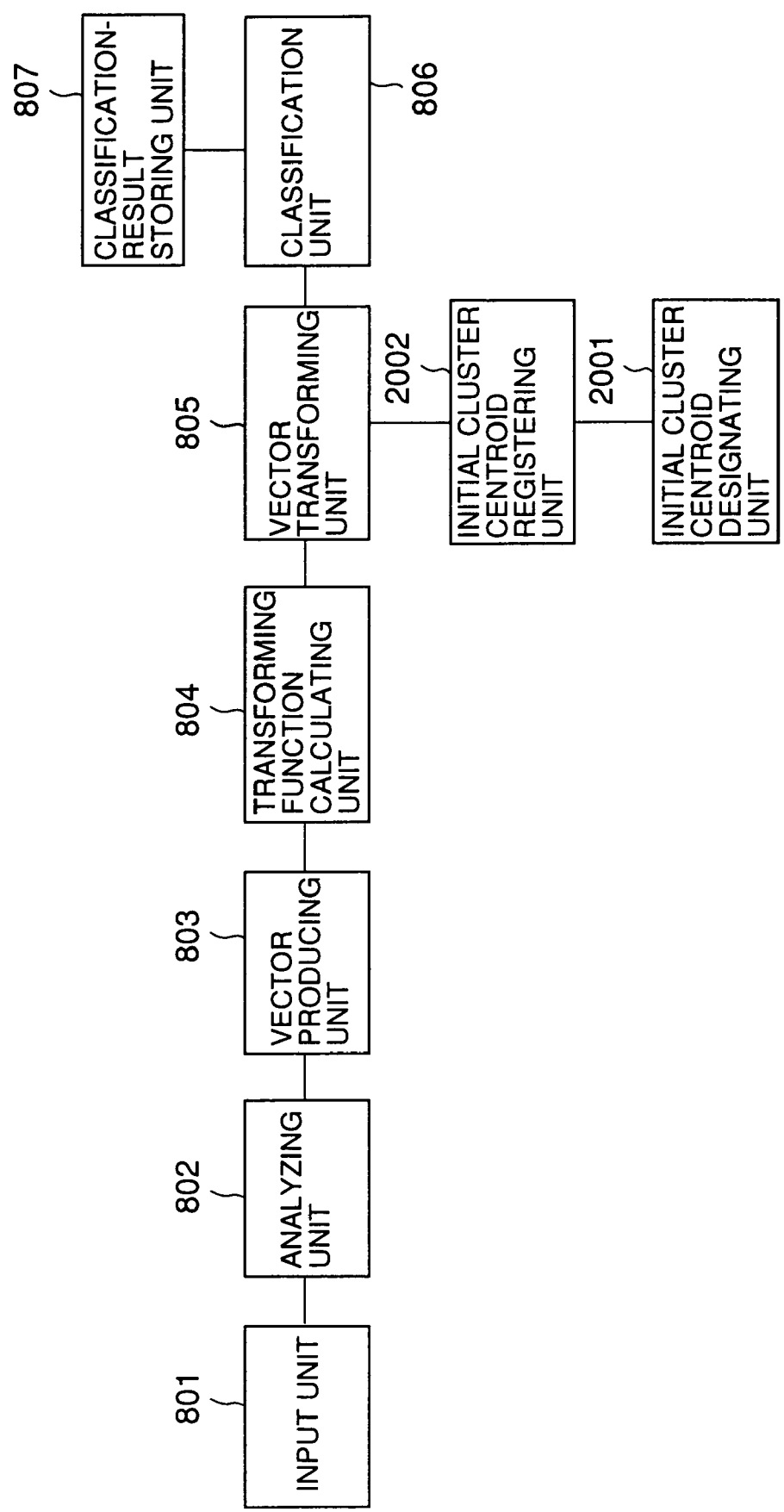
FIG. 26 is a functional block diagram of a document classification system according to an eighth embodiment of the present invention.

FIG. 26 is a functional block diagram of a document classification system according to the eighth embodiment of the present invention. In FIG. 26, parts that are the same as the parts shown in FIG. 10 are given the same reference numerals, and descriptions thereof will be omitted.

The initial cluster centroid designating unit 2001 designates an initial cluster centroid. The initial cluster centroid registering unit 2002 registers the initial cluster centroid designated by the cluster weight center designating unit 2001. Additionally, the classification unit 805 classifies the document in accordance with the initial cluster centroid registered by the initial cluster centroid registering unit 2002.

Each of the initial cluster center weight designating unit 2001 and the initial cluster center weight designating unit 2002 can be achieved by performing a process instructed by the CPU 201 or 301 according to programs stored in the ROM 202 or 302, the RAM 203 or 303, the disk unit 206 or the hard disk drive 304.

Normally, the criteria of classification when document classification is performed by using chi-square, discriminant analysis or cluster analysis is established based on a statistical theory. However, in the present embodiment, a final evaluation of a quality of classification when the document classification is performed is not a statistical numeric evaluation but a subjective evaluation by the operator who analyzes the result of the classification. Accordingly, in various methods for performing document classification, operator's intention can be reflected in the result of classification by providing a room for the operator to intervene the process of classification. As a result, a quality of the result of classification can be improved.

Figure 27:
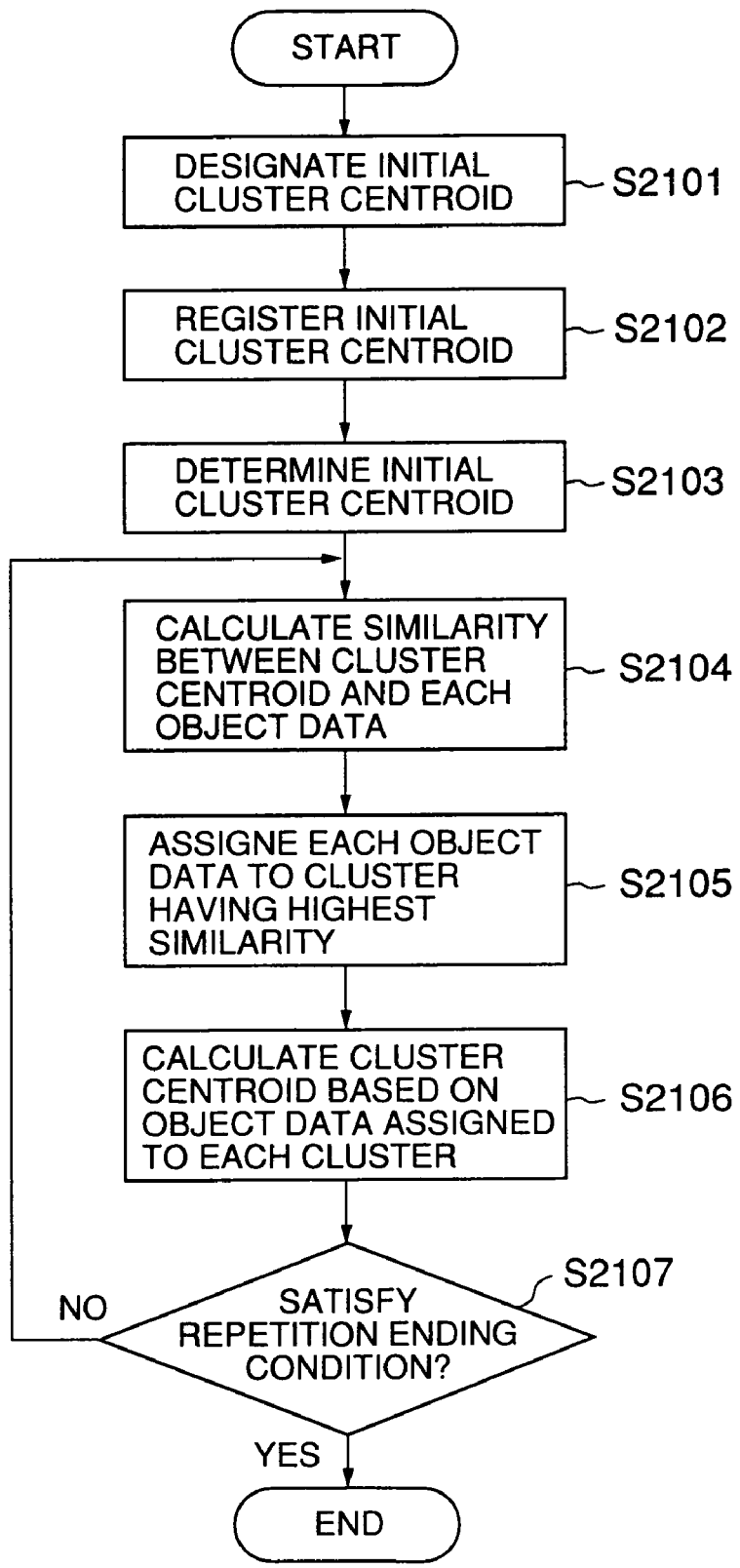
FIG. 27 is a flowchart of an operation performed by the document classification system according to the eighth embodiment of the present invention.

FIG. 27 is a flowchart of an operation performed by the document classification system according to the eighth embodiment of the present invention. When the operation shown in FIG. 27 is started, the initial cluster centroid is designated in step S2101. In step S2102, the initial cluster centroid is registered. Thereafter, in step S2103, the initial cluster centroid is determined. In step S2104, similarity between the initial cluster centroid and each document data to be classified is calculated.

Thereafter, in step 2105, each document data to be classified is assigned to a cluster having highest similarity. In step 2106, a cluster weight center is calculated based on the data to be classified that is assigned to each cluster.

It is then determined, in step S2107, whether or not a stopping condition of iteration is satisfied. If the stopping condition of iteration is not satisfied, the routine returns to step S2104 so as to iterate (all in cluster) the process of steps S2104 to S2106. If the stopping condition of iteration is satisfied, the routine is ended.

It is considered that a result of classification strongly depends on the initial cluster centroid to be selected. Accordingly, the operator is allowed to intervene the process of classification by having the operator to designate the initial cluster centroid. Thus, document classification in which the operator's intention is reflected can be achieved.

It should be noted that a method other than the non-hierarchical clustering method such as a k-means method can be used as long as the method includes calculating similarity between the centroid vector of the cluster and each document feature vector and rendering the document feature vector to a classification representative/typical information having the highest similarity with respect to the document feature vector. Additionally, as for the measure for measuring the similarity between the cluster weight center vector and the document vector, cosine measure, inner product measure, Euclid distance measure, Mahlanobis' distance measure may be used.

A plurality of arbitrary document vectors having the same number of feature dimensions as the data to be classified is input as the initial cluster centroid by the initial cluster centroid designating unit 2001. The arbitrary document vectors can be designated by the operator. Alternatively, the arbitrary document data can be indirectly designated by the operator selecting a rule established based on the document feature vectors to be classified.

Additionally, as for the arbitrary document vectors, any vector can be used as long as the vector has the same number of dimensions as the document feature vector. Further, as for the arbitrary document vectors, a document other than the documents to be classified may be used as one which is easily understandable by the operator, the document being represented by a vector having the same dimensions as the document feature vector. Additionally, the document feature vector may be used as information which can be designated by the operator.

Additionally, as for the arbitrary document vectors, the document feature vector may be used. Further, as for the arbitrary document vectors, words extracted by the analyzing unit 802 or input by the operator or information regarding parts of speech of the words may be used. Further, a classification representative value which is a result of classification previously performed and stored in the classification-result storing unit 807 may be used.

The above-mentioned designation information can be used alone or in combination with other designation information.

Figure 28:
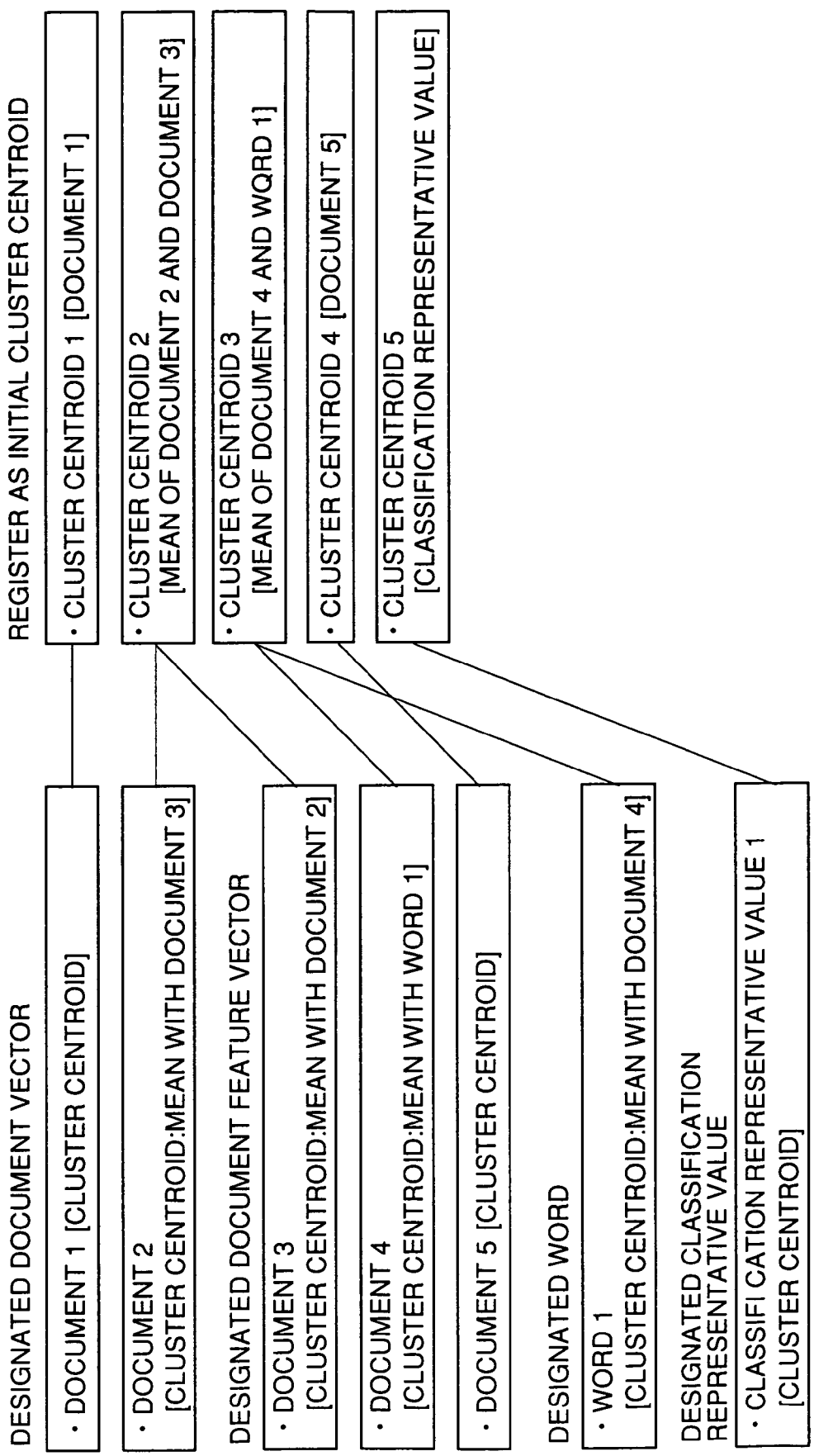
FIG. 28 is an illustration for explaining a process for obtaining initial cluster centroids.

FIG. 28 is an illustration for explaining a process for obtaining initial cluster centroids. In FIG. 28, five initial cluster centroids are obtained from tow arbitrary document vectors, three document feature vectors, one word and one classification representative value by designating a rule of combination thereof. As shown in FIG. 28, according to the present embodiment, the document 1 is designated as the initial cluster centroid 1; a mean value of the document 2 and document 3 is designated as the initial cluster centroid 2; a mean value of the document 4 and the word 1 is designated as the initial cluster centroid 3; the document 5 is designated as the initial cluster centroid 4; and the classification representative value 1 is designated as the initial cluster centroid 5.

Additionally, if the number of the designated document vectors is smaller than the number of clusters, the rest of the cluster weight centers can be obtained by using a conventional automatic initial cluster centroid selecting method such as one used in the K-means method. The document classification is performed by processing the clusters by using the k-means method based on the thus-obtained initial cluster centroid.

As mentioned above, according to the eighth embodiment of the present invention, the non-hierarchical clustering method is used as a method for classifying a document, and necessary initial cluster centroids are arbitrarily designated by the operator so that the document classification is performed in accordance with the designated initial cluster centroids. Thus, the document classification in which operator's intention is reflected can be performed.

The present invention is not limited to the specifically disclosed embodiments, and variations and modifications may be made without departing from the scope of the present invention.

The present application is based on Japanese priority applications No. 10-114414 filed on Apr. 10, 1998 and No. 10-115907 filed on Apr. 13, 1998, the entire contents of which are hereby incorporated by reference.

What is claimed is:

1. A document classification system for classifying a document according to contents of the document, said document classification system comprising:
    input means for inputting document data of the document;
    analyzing means for analyzing the document data so as to obtain analysis information;
    vector producing means for producing a document feature vector with respect to the document data based on the analysis information;
    transforming function calculating means for calculating a representation transforming function used for projecting the document feature vector onto a space in which similarity between the document feature vectors is reflected with a dimensional number different from a dimensional number of the document feature vector, the transforming function calculating means calculating the representation transforming function by using an inner product calculated between the document feature vectors;
    vector transforming means for transforming the document feature vector by using the representation transforming function;
    classification means for classifying the document based on similarity between the document feature vectors transformed by the vector transforming means; and
    classification result storing means for storing a result of classification performed by the classification means.

2. The document classification system as claimed in 1, further comprising inner product calculating means for calculating an inner product between the document feature vectors, wherein said representation transforming function calculating means calculates the representation transforming function by using the inner product.

3. A document classification system for classifying a document according to contents of the document, said document classification system comprising:
    input means for inputting document data of the document;
    analyzing means for analyzing the document data so as to obtain analysis information;
    vector producing means for producing a document feature vector with respect to the document data based on the analysis information;
    transforming function calculating means for calculating a representation transforming function used for projecting the document feature vector onto a space in which similarity between the document feature vectors is reflected;
    vector transforming means for transforming the document feature vector by using the representation transforming function;
    classification means for classifying the document based on similarity between the document feature vectors transformed by the vector transforming means;
    classification result storing means for storing a result of classification performed by the classification means;
    inner product calculating means for calculating an inner product between the document feature vectors, wherein said representation transforming function calculating means calculates the representation transforming function by using the inner product; and
    document similarity information setting means for setting document similarity setting information including data representing an author of the document and a date of production of the document, wherein said representation transforming function calculating means calculates the representation transforming function by using the inner product and the document similarity information.

4. The document classification system as claimed in 1, further comprising:
    vector storing means for storing the document feature vector produced by said vector producing means; and
    transforming function storing means for storing the representation transforming function calculated by said representation transforming function calculating means.

5. A document classification system for classifying a document according to contents of the document, said document classification system comprising:
    input means for inputting document data of the document;
    analyzing means for analyzing the document data so as to obtain analysis information;
    vector producing means for producing a document feature vector with respect to the document data based on the analysis information;
    transforming function calculating means for calculating a representation transforming function used for projecting the document feature vector onto a space in which similarity between the document feature vectors is reflected;
    vector transforming means for transforming the document feature vector by using the representation transforming function;
    classification means for classifying the document based on similarity between the document feature vectors transformed by the vector transforming means;
    classification result storing means for storing a result of classification performed by the classification means; and
    vector correcting means for correcting the document feature vector before the document feature vector is transformed by said vector transforming means, a correction being performed by processing one of the document feature vector and a feature dimension constituting the document feature vector in accordance with a rule established by characteristics of words extracted by said analyzing means.

6. The document classification system as claimed in 5, further comprising transforming function correcting means for correcting the representation transforming function calculated by said transforming function calculating means when the feature dimension is changed due to a correction of the document feature vector by said vector correcting means so that the document feature vector is transformed by said vector transforming means in accordance with the changed feature dimension.

7. A document classification system for classifying a document according to contents of the document, said document classification system comprising:
   input means for inputting document data of the document;
   analyzing means for analyzing the document data so as to obtain analysis information;
   vector producing means for producing a document feature vector with respect to the document data based on the analysis information;
   transforming function calculating means for calculating a representation transforming function used for projecting the document feature vector onto a space in which similarity between the document feature vectors is reflected;
   vector transforming means for transforming the document feature vector by using the representation transforming function;
   classification means for classifying the document based on similarity between the document feature vectors transformed by the vector transforming means;
   classification-result storing means for storing a result of classification performed by the classification means;
   transforming function correction instructing means for sending an instruction regarding a process to be applied on a feature dimension of the representation transforming function; and
   transforming function correcting means for correcting the representation transforming function based on a content of the instruction sent from said transforming function correction instructing means.

8. The document classification system as claimed in 7, wherein the process indicated in the content of the instruction is performed by using data of an arbitrary document vector.

9. The document classification system as claimed in 7, wherein the process indicated in the content of the instruction is performed by using the document feature vectors.

10. The document classification system as claimed in 7, wherein the process indicated in the content of the instruction is performed by using the analysis information obtained by said analyzing means.

11. The document classification system as claimed in 7, wherein the process indicated in the content of the instruction is performed by using the result of classification stored in said classification-result storing means.

12. A document classification system for classifying a document according to contents of the document, said document classification system comprising:
   input means for inputting document data of the document;
   analyzing means for analyzing the document data so as to obtain analysis information;
   vector producing means for producing a document feature vector with respect to the document data based on the analysis information;
   transforming function calculating means for calculating a representation transforming function used for projecting the document feature vector onto a space in which similarity between the document feature vectors is reflected;
   vector transforming means for transforming the document feature vector by using the representation transforming function;
   classification means for classifying the document based on similarity between the document feature vectors transformed by the vector transforming means;
   classification result storing means for storing a result of classification performed by the classification means;
   an initial cluster centroid designating means for designating an initial cluster centroid; and
   initial cluster centroid registering means for registering the initial cluster centroid designated by said initial cluster centroid designating means,
   wherein said classification means classifies the document in accordance with the initial cluster centroid registered by said initial cluster centroid registering means.

13. The document classification system as claimed in 12, wherein the initial cluster centroid designated by said initial cluster centroid designating means is arbitrary document vector data.

14. The document classification system as claimed in 12, wherein the initial cluster centroid designated by said initial cluster centroid designating means is the document feature vector.

15. The document classification system as claimed in 12, wherein the initial cluster centroid designated by said initial cluster centroid designating means is the analysis information obtained by said analyzing means.

16. The document classification system as claimed in 12, wherein the initial cluster centroid designated by said initial cluster centroid designating means is the result of classification stored by said classification-result storing means.

17. A processor readable medium storing program code causing a computer to classify a document according to contents of the document, comprising:
   first program code means for inputting document data of the document;
   second program code means for analyzing the document data so as to obtain analysis information;
   third program code means for producing a document feature vector with respect to the document data based on the analysis information;
   fourth program code means for calculating a representation transforming function used for projecting the document feature vector onto a space in which similarity between the document feature vectors is reflected with a dimensional number different from a dimensional number of the document feature vector, the fourth program code means calculating the representation transforming function by using an inner product calculated between the document feature vectors;
   fifth program code means for transforming the document feature vector by using the representation transforming function;
   sixth program code means for classifying the document based on similarity between the document feature vectors transformed by the fifth program code means; and
   seventh program code means for storing a result of classification performed by the classification means.

18. The processor readable medium as claimed in 17, further comprising eighth program code means for calculating an inner product between the document feature vectors, wherein the representation transforming function is calculated by using the inner product.

19. A processor readable medium storing program code causing a computer to classify a document according to contents of the document, comprising:
   first program code means for inputting document data of the document;

second program code means for analyzing the document data so as to obtain analysis information;

third program code means for producing a document feature vector with respect to the document data based on the analysis information;

fourth program code means for calculating a representation transforming function used for projecting the document feature vector onto a space in which similarity between the document feature vectors is reflected;

fifth program code means for transforming the document feature vector by using the representation transforming function;

sixth program code means for classifying the document based on similarity between the document feature vectors transformed by the fifth program code means;

seventh program code means for storing a result of classification performed by the classification means;

eighth program code means for calculating an inner product between the document feature vectors, wherein the representation transforming function is calculated by using the inner product; and ninth program code means for setting document similarity setting information including data representing an author of the document and a date of production of the document, wherein the representation transforming function is calculated by using the inner product and the document similarity information.

20. The processor readable medium as claimed in 17, further comprising:

tenth program code means for storing the document feature vector produced by the third program code means; and eleventh program code means for storing the representation transforming function calculated by the fourth program code means.

21. A processor readable medium storing program code causing a computer to classify a document according to contents of the document, comprising:

first program code means for inputting document data of the document;

second program code means for analyzing the document data so as to obtain analysis information;

third program code means for producing a document feature vector with respect to the document data based on the analysis information;

fourth program code means for calculating a representation transforming function used for projecting the document feature vector onto a space in which similarity between the document feature vectors is reflected;

fifth program code means for transforming the document feature vector by using the representation transforming function;

sixth program code means for classifying the document based on similarity between the document feature vectors transformed by the fifth program code means;

seventh program code means for storing a result of classification performed by the classification means; and eighth program code means for correcting the document feature vector before the document feature vector is transformed by the fifth program code means, a correction being performed by processing one of the document feature vector and a feature dimension constituting the document feature vector in accordance with a rule established by characteristics of words extracted by the second program code means.

22. The processor readable medium as claimed in 21, further comprising ninth program code means for correcting the representation transforming function calculated by the fourth program code means when the feature dimension is changed due to a correction of the document feature vector by the eighth program code means so that the document feature vector is transformed by the fifth program code means in accordance with the changed feature dimension.

23. A processor readable medium storing program code causing a computer to classify a document according to contents of the document, comprising:

first program code means for inputting document data of the document;

second program code means for analyzing the document data so as to obtain analysis information;

third program code means for producing a document feature vector with respect to the document data based on the analysis information;

fourth program code means for calculating a representation transforming function used for projecting the document feature vector onto a space in which similarity between the document feature vectors is reflected;

fifth program code means for transforming the document feature vector by using the representation transforming function;

sixth program code means for classifying the document based on similarity between the document feature vectors transformed by the fifth program code means;

seventh program code means for storing a result of classification performed by the classification means;

eighth program code means for sending an instruction regarding a process to be applied on a feature dimension of the representation transforming function; and ninth program code means for correcting the representation transforming function based on a content of the instruction sent by the eighth program code means.

24. A processor readable medium storing program code causing a computer to classify a document according to contents of the document, comprising:

first program code means for inputting document data of the document;

second program code means for analyzing the document data so as to obtain analysis information;

third program code means for producing a document feature vector with respect to the document data based on the analysis information;

fourth program code means for calculating a representation transforming function used for projecting the document feature vector onto a space in which similarity between the document feature vectors is reflected;

fifth program code means for transforming the document feature vector by using the representation transforming function;

sixth program code means for classifying the document based on similarity between the document feature vectors transformed by the fifth program code means;

seventh program code means for storing a result of classification performed by the classification means;

eighth program code means for designating an initial cluster centroid; and ninth program code means for registering the initial cluster centroid designated by the eighth program code means, wherein the document is classified in accordance with the initial cluster centroid registered by the ninth program code means.

* * * * *